Jan. 20, 1953  R. E. RUNDELL  2,625,936
FILLER FEED FOR CIGAR MACHINES
Filed April 21, 1945  15 Sheets-Sheet 1

INVENTOR
RUPERT E. RUNDELL
BY George S Hastings
ATTORNEY

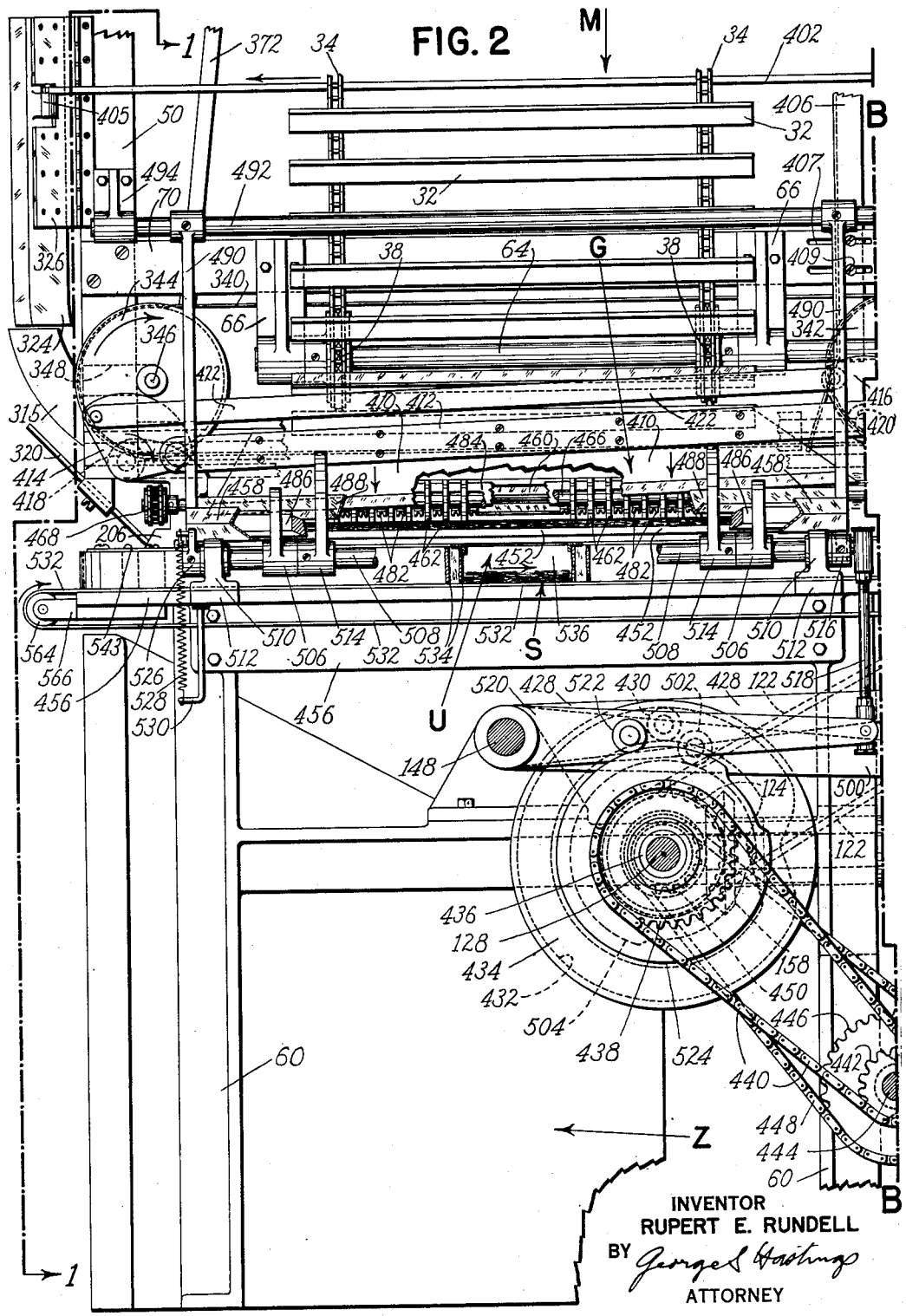

INVENTOR
RUPERT E. RUNDELL
BY *Georges S. Hastings*
ATTORNEY

Jan. 20, 1953        R. E. RUNDELL        2,625,936
FILLER FEED FOR CIGAR MACHINES
Filed April 21, 1945        15 Sheets-Sheet 6
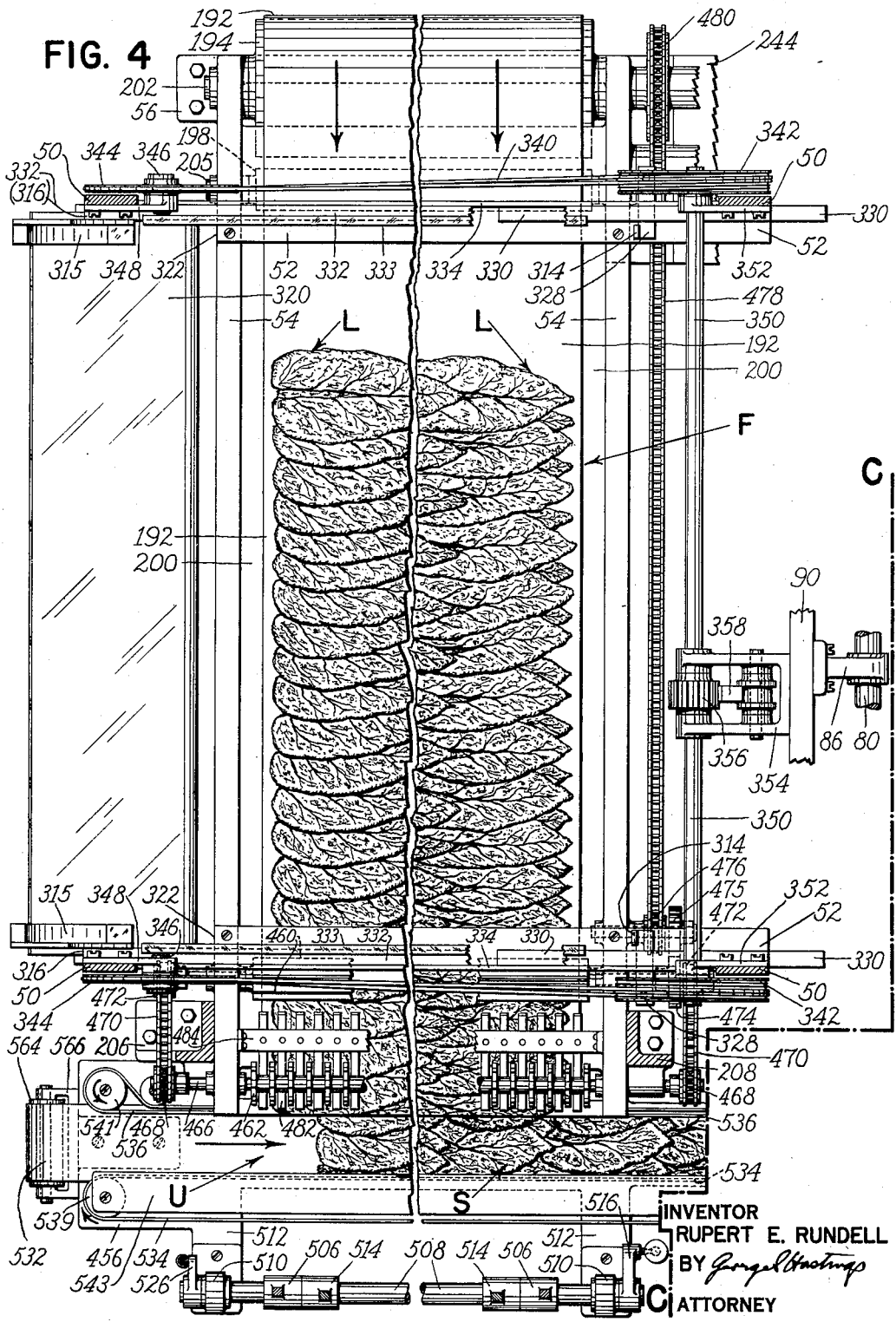
INVENTOR
RUPERT E. RUNDELL
BY George Hastings
ATTORNEY Jan. 20, 1953  R. E. RUNDELL  2,625,936
FILLER FEED FOR CIGAR MACHINES
Filed April 21, 1945  15 Sheets-Sheet 7

FIG. 4a

INVENTOR
RUPERT E RUNDELL
BY George S. Hastings
ATTORNEY

Jan. 20, 1953 R. E. RUNDELL 2,625,936
FILLER FEED FOR CIGAR MACHINES
Filed April 21, 1945 15 Sheets-Sheet 8
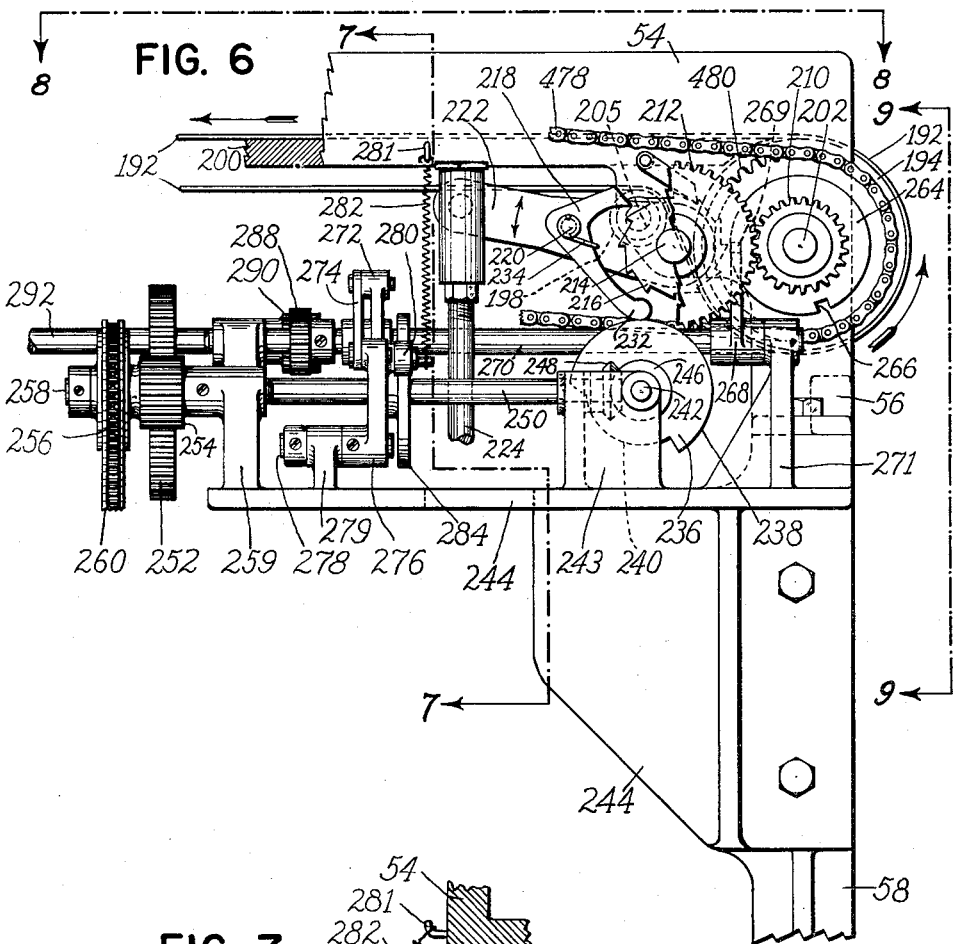
INVENTOR
RUPERT E. RUNDELL
BY *George S. Hastings*
ATTORNEY Jan. 20, 1953 R. E. RUNDELL 2,625,936
FILLER FEED FOR CIGAR MACHINES
Filed April 21, 1945 15 Sheets-Sheet 9
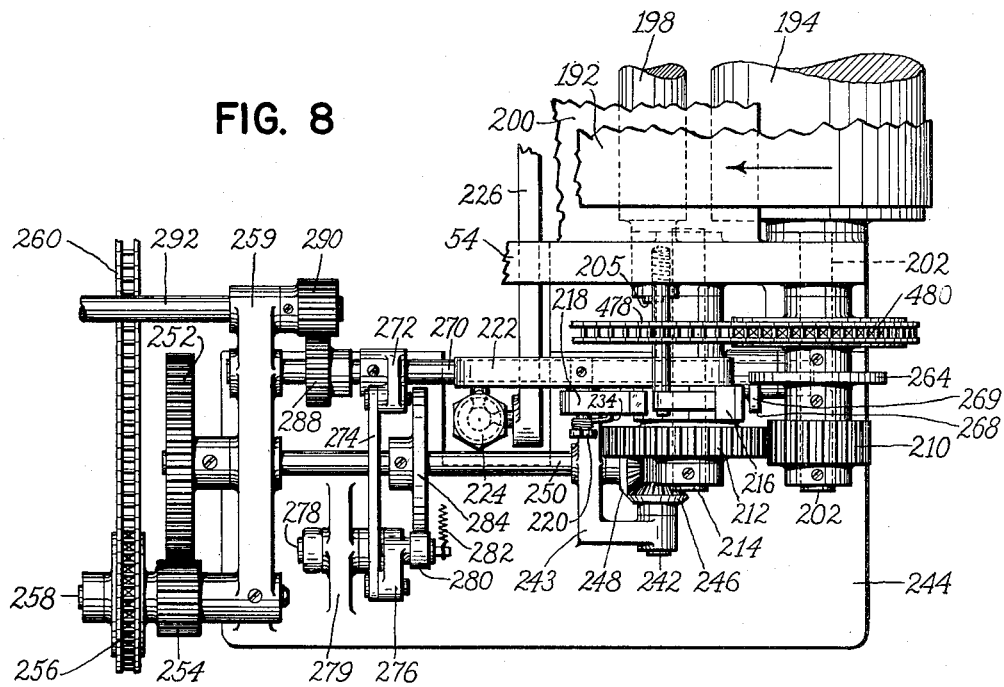
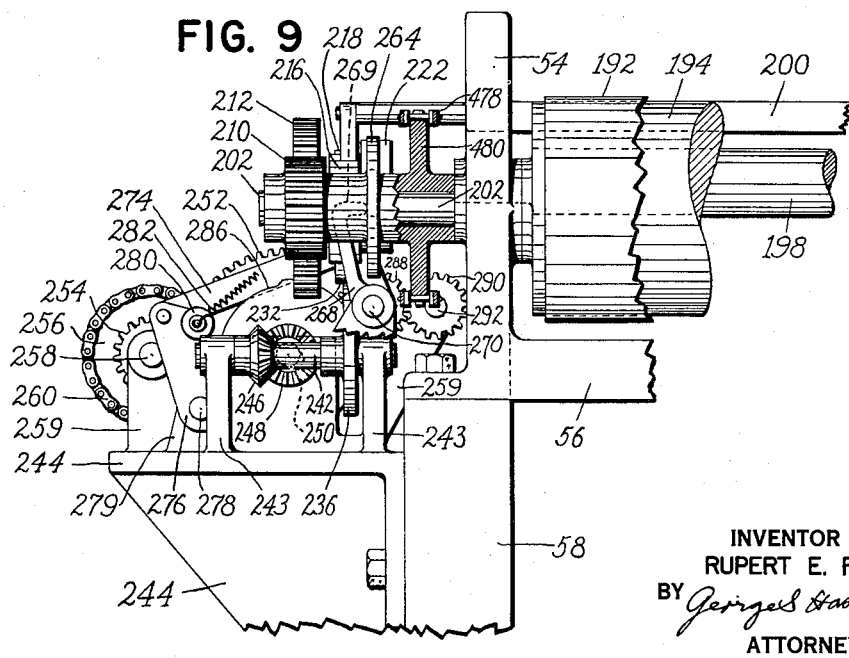
INVENTOR
RUPERT E. RUNDELL
BY *Georges Hastings*
ATTORNEY Jan. 20, 1953 — R. E. RUNDELL — 2,625,936
FILLER FEED FOR CIGAR MACHINES
Filed April 21, 1945 — 15 Sheets-Sheet 10
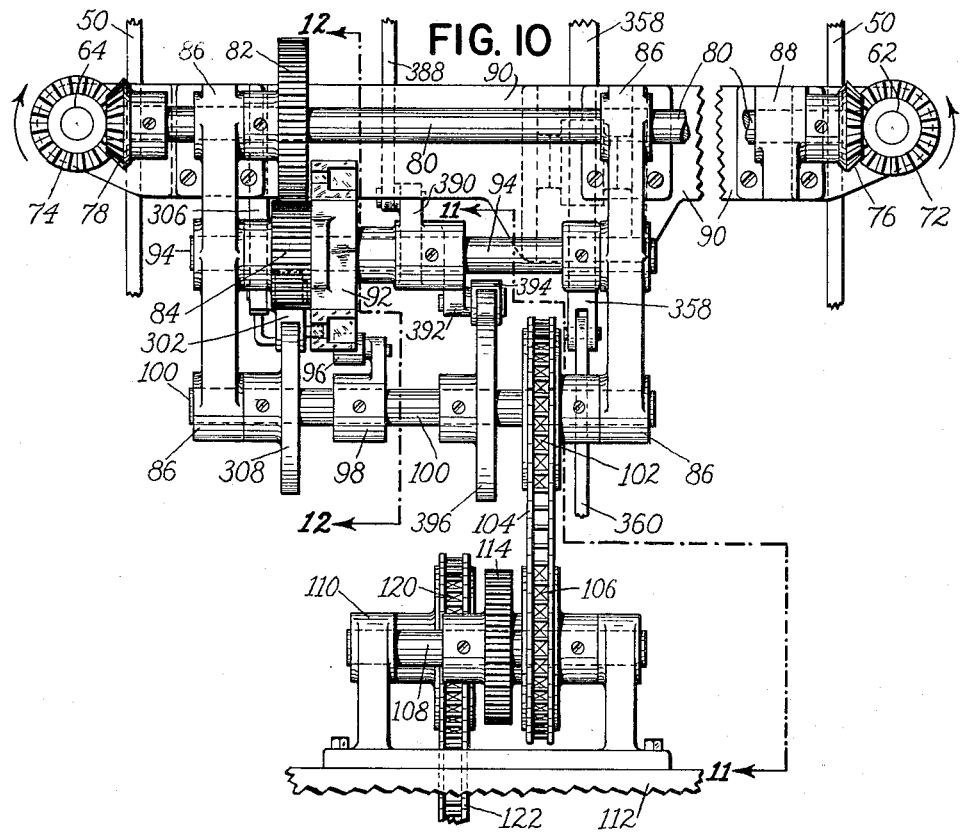
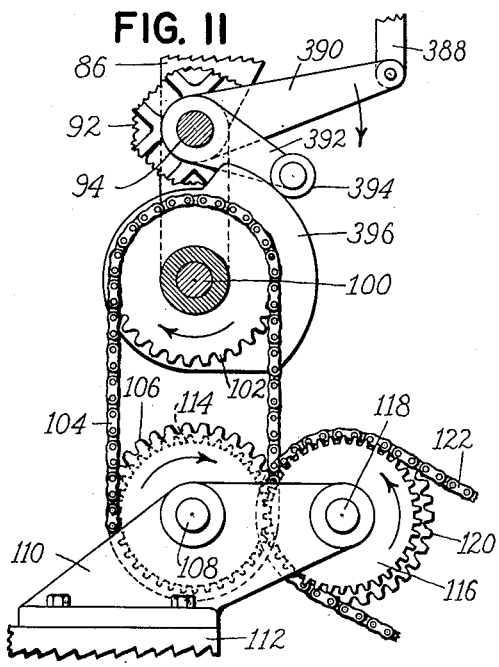
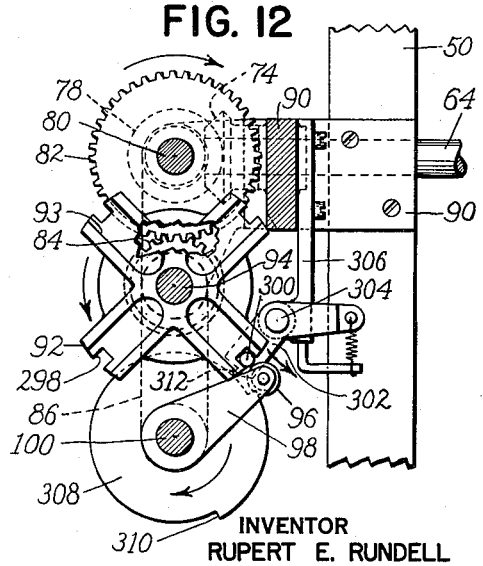
INVENTOR
RUPERT E. RUNDELL
BY
ATTORNEY Jan. 20, 1953 R. E. RUNDELL 2,625,936
FILLER FEED FOR CIGAR MACHINES
Filed April 21, 1945 15 Sheets-Sheet 11
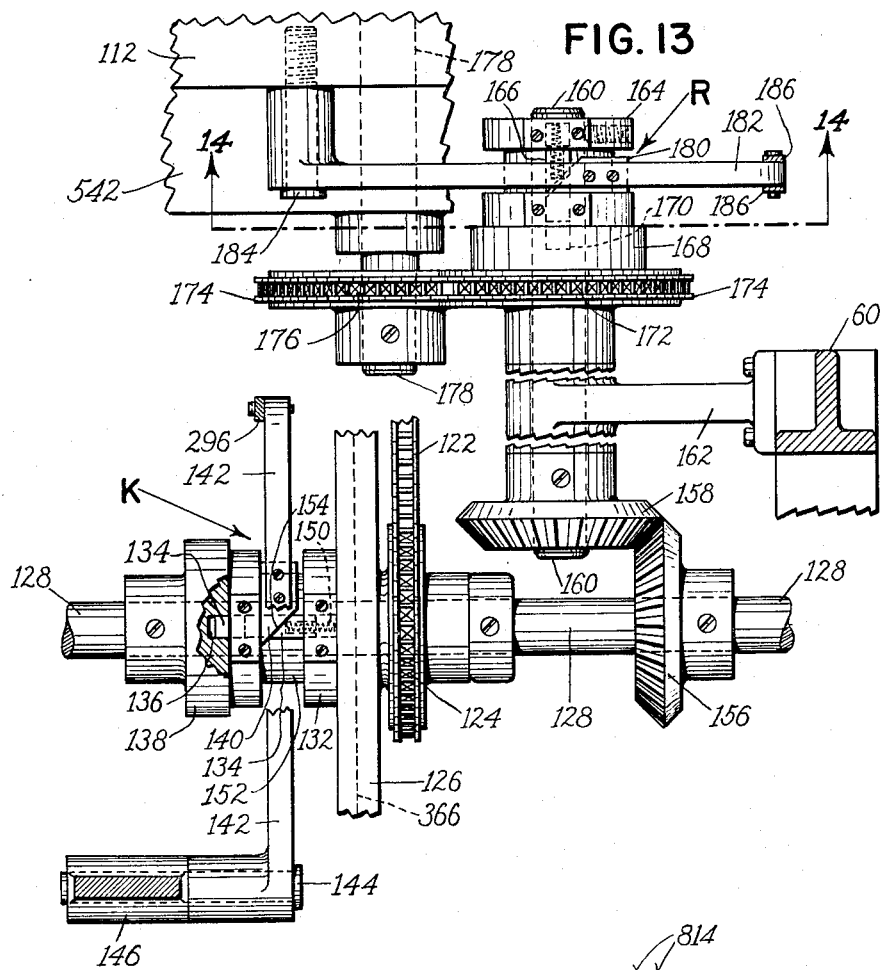
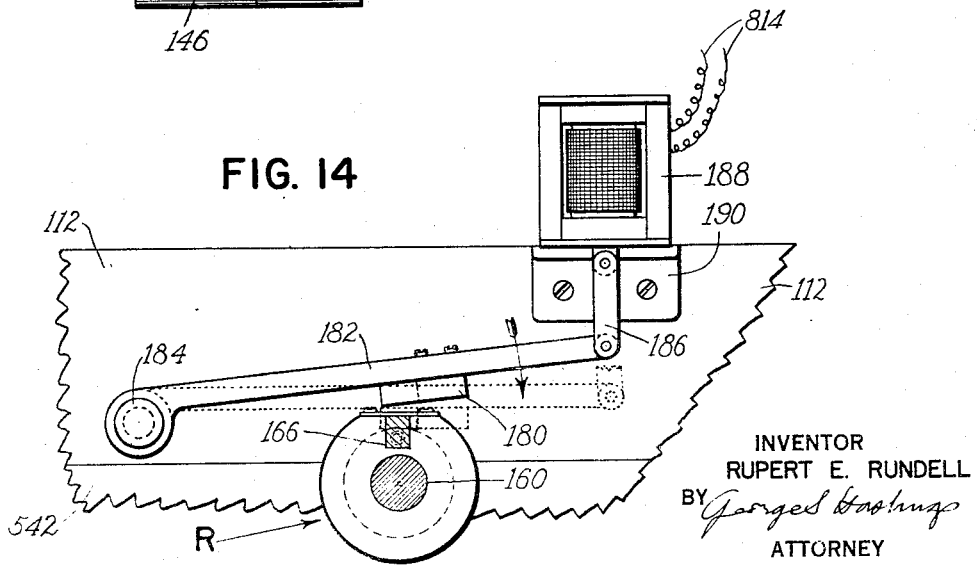
INVENTOR
RUPERT E. RUNDELL
BY *Georges Hastings*
ATTORNEY

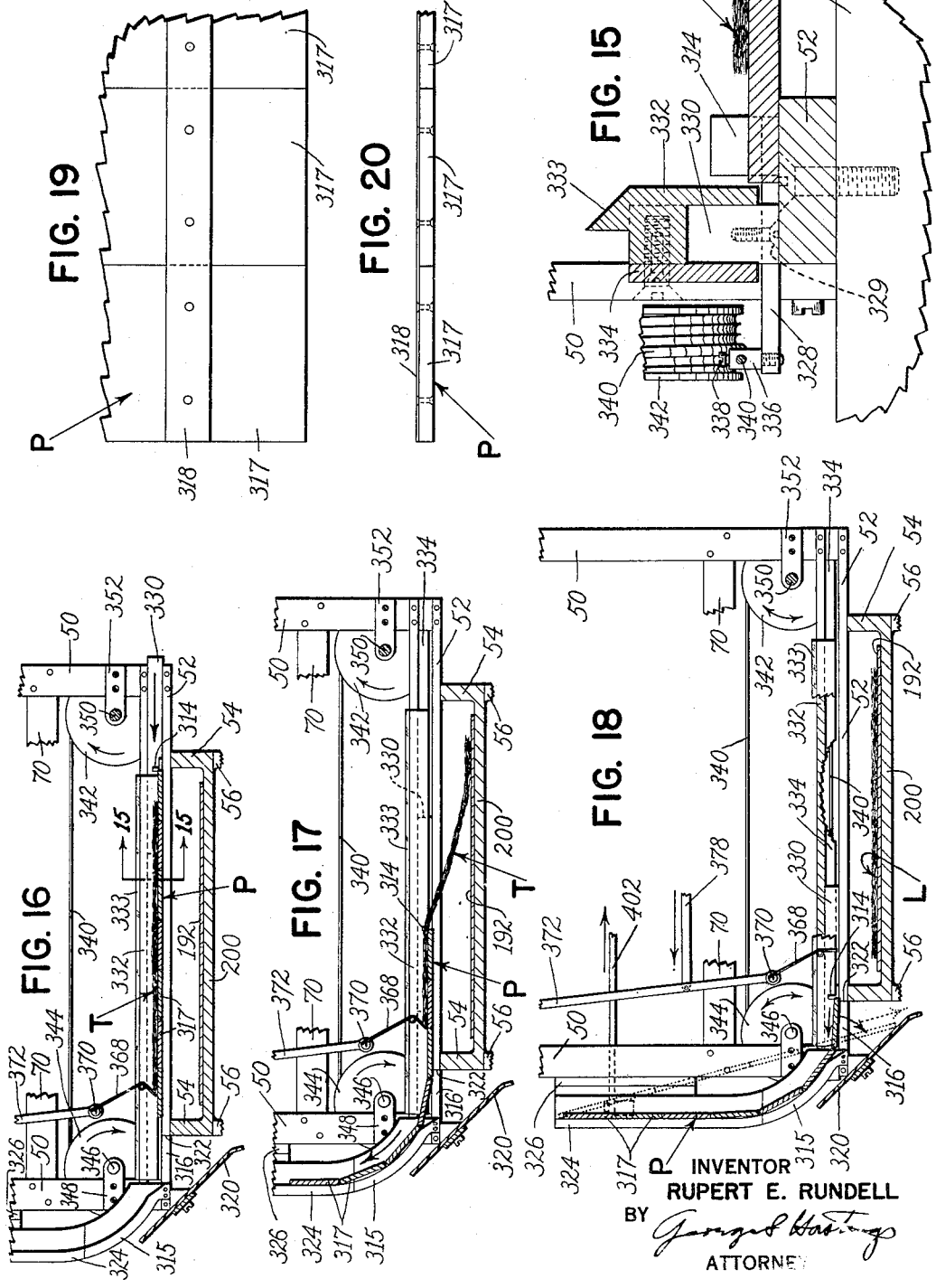

Jan. 20, 1953 R. E. RUNDELL 2,625,936
FILLER FEED FOR CIGAR MACHINES
Filed April 21, 1945 15 Sheets-Sheet 13
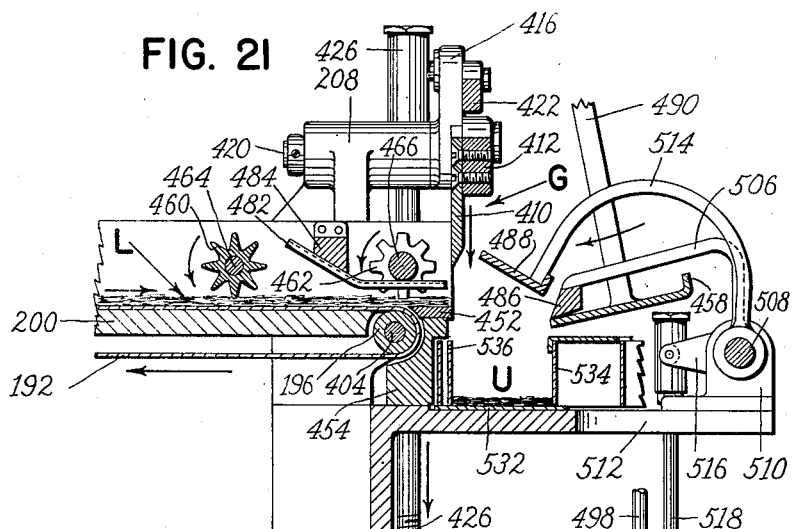
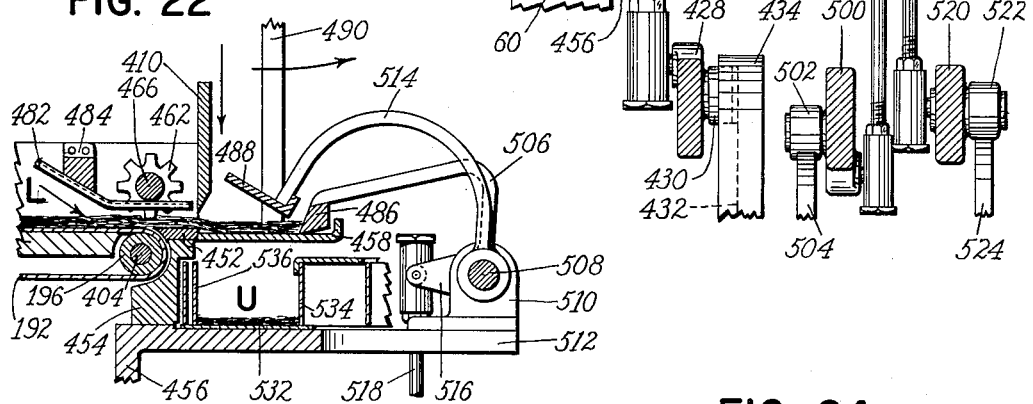
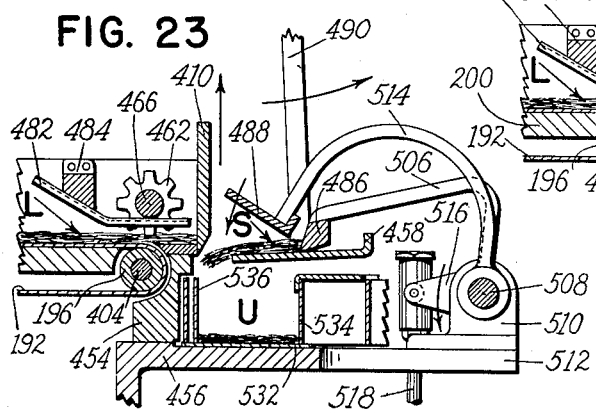
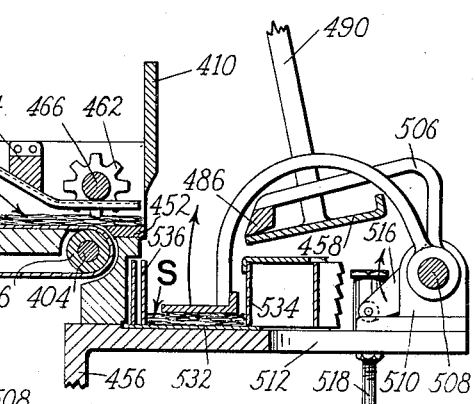
INVENTOR
RUPERT E. RUNDELL
BY *George S. Hastings*
ATTORNEY Jan. 20, 1953   R. E. RUNDELL   2,625,936
FILLER FEED FOR CIGAR MACHINES
Filed April 21, 1945   15 Sheets-Sheet 14
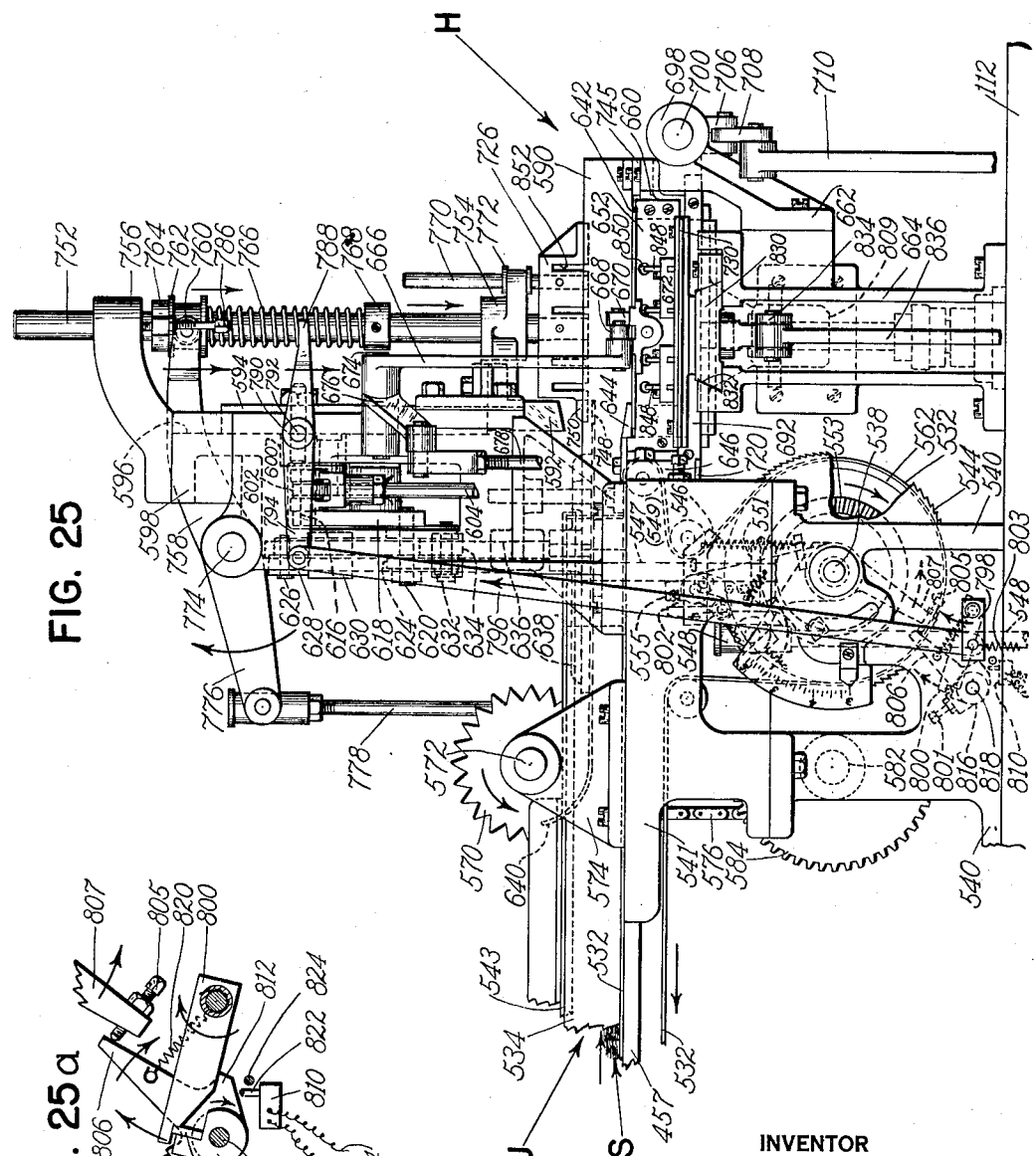
INVENTOR
RUPERT E. RUNDELL
BY George S. Hastings
ATTORNEY

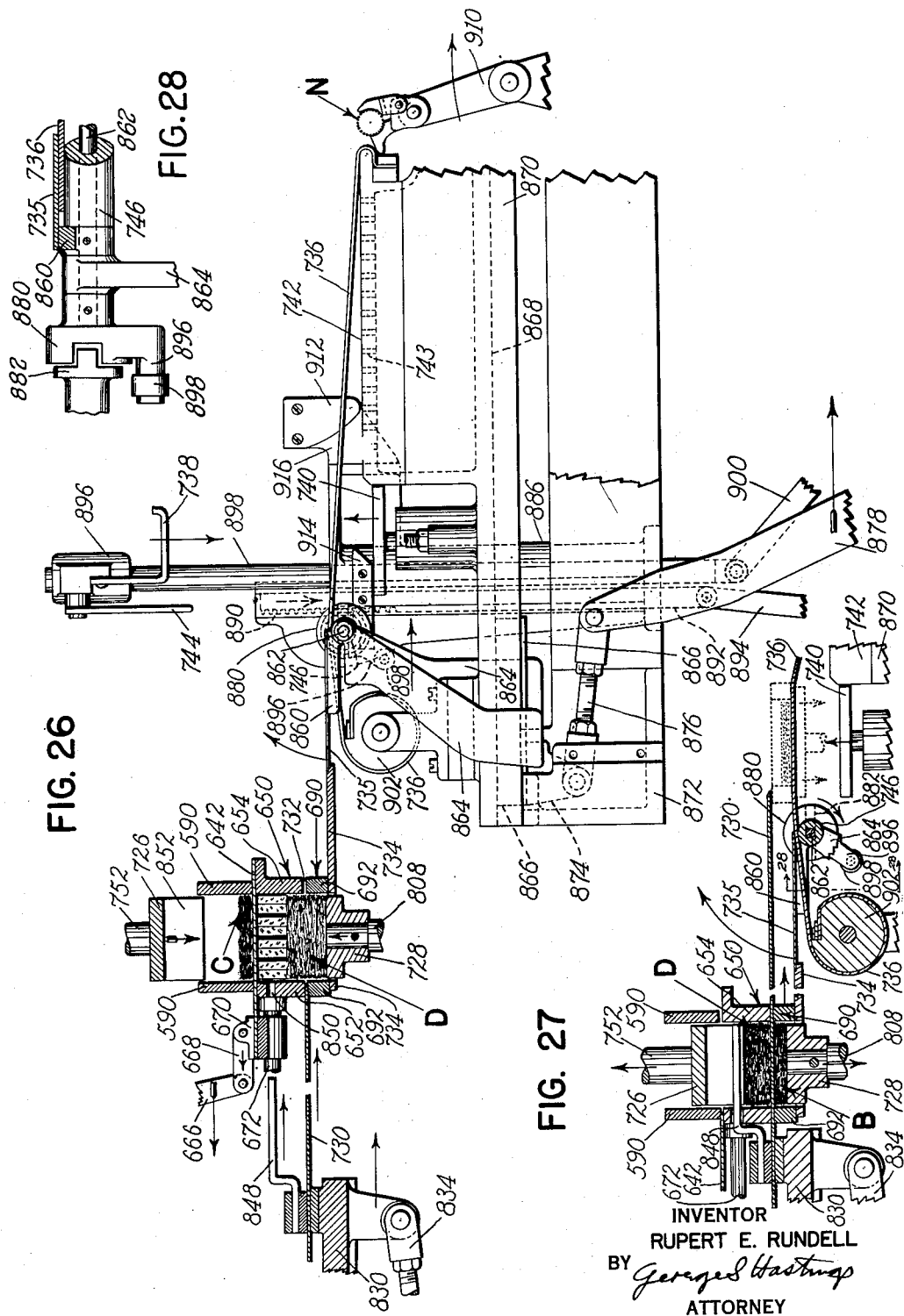

UNITED STATES PATENT OFFICE 2,625,936

FILLER FEED FOR CIGAR MACHINES

Rupert E. Rundell, Rockville Centre, N. Y., assignor to International Cigar Machinery Corporation, a corporation of New Jersey Application April 21, 1945, Serial No. 589,514

34 Claims. (Cl. 131—21)

This invention relates to cigar machines, and more particularly to a cigar machine provided with an automatic filler feed whereby cigar filler tobacco, preferably long filler tobacco, is automatically fed, cut to length, and advanced to a bunch charge forming device where measured, substantially uniform bunch charges are rolled into bunches and all operations incident to the formation of bunch charges are performed automatically.

Attempts have been made in the past to feed long filler tobacco automatically from a bulk mass in a hopper or other receptacle in which leaves or portions thereof comprising long filler tobacco are contained indiscriminately and are delivered therefrom to cigar machines. However, due to the nature and characteristics of tobacco as well as the non-uniformity of the leaves and pieces commonly classified as long filler tobacco, it has been difficult to accomplish this purpose satisfactorily. According to my invention I have provided a magazine which is adapted to contain a plurality of trays or plates covered or partially covered with prearranged layers of tobacco substantially uniform in area and varying as little as possible in thickness. In this manner it can be seen that tobacco fed to a cigar machine is arranged in an orderly relationship with respect to the several instrumentalities which operate upon each layer of tobacco from the time it is fed from the magazine until the tobacco contained therein is formed into measured bunch charges and rolled into bunches. The tobacco of each layer is intermittently advanced edgewise, predetermined widths or strips constituting equal multiples of the original width of an entire layer are cut from the advancing edge thereof and deposited, preferably in overlapping relationship, in the cross feed of the cigar machine where they form a substantially continuous stream of shingled strips, which stream is moved intermittently to a cigar bunch forming machine where bunch charge lengths are cut from the stream and are superimposed to form a column of tobacco from which substantially uniform bunch charges are separated and rolled with the binder into bunches.

In placing long filler leaves and portions thereof in the cross feed of a cigar machine, it is extremely difficult to so locate the leaves and portions so that the edges of the leaves or portions do not curl or curve upwardly against the side walls of the cross conveyors forming the side walls of the cross feed. As a result of this method of feeding when bunch lengths are cut from the stream of tobacco advanced by the cross feed and associated in columnar relationship in the bunch forming machine, the edges of each bunch length may contain one or more bent over or folded leaf portions. When, therefore, a charge is separated from the column of tobacco, the knife in moving against the column cuts through the folded portions and very possibly forms small particles or scrap pieces in so doing. This of course is not desirable from the point of view of the best type of long filler cigar.

The mechanism for handling long filler tobacco and the method disclosed herein, according to the present invention, contribute materially to the solution of the problem of automatically forming long filler cigars containing a minimum of short pieces or particles and hence the production of long filler cigars having better smoking characteristics and saleability. This desired result is obtained by so arranging and handling the tobacco that as it travels through the machine from the source of supply, the leaves and/or portions thereof are at all times maintained substantially flat. Each strip of predetermined width cut from the wide layer fed edgewise to cutting position above the cross feed and deposited on the conveyor belt thereof lies substantially flat thereon with its edges substantially open and free from folded or bent leaves. It will be seen, therefore, that as the stream of tobacco advanced by the cross feed is forwarded to the bunch length cutter and bunch lengths are cut therefrom, that when such lengths are superimposed in columnar formation the column thus formed is constituted of a large number of laminated leaves or portions thereof and that the longitudinal edges of the column consist of substantially open laminated leaves providing easy access for the separating knife. This arrangement means, therefore, that the separating knife moves freely through the laminations to separate a measured bunch charge and that the reduction of leaves or pieces thereof to small particles or scrap size is held at a minimum. The mechanism constituting the present invention makes possible the production of bunch charges substantially uniform in length, breadth and thickness which when rolled in binders form cigar bunches substantially uniform in size and density.

The mechanism provided for feeding tobacco insures that each prearranged layer of tobacco from the time it is deposited in the source of supply until measured bunch charges are formed into bunches will retain substantially the tobacco leaf arrangement and condition as when each layer was first formed on its respective supporting trays or plate.

In a preferred embodiment of my invention there is provided a magazine in which are located spaced traveling supports having tray positioning and holding bars which support trays or plates loaded with layers of long filler tobacco leaves and/or portions thereof. The several loaded trays are positioned by an operator in stacked arrangement on the supporting and holding bars and delivered one by one to a layer delivery position adjacent the bottom of the magazine where each layer of tobacco is removed from its respective tray and deposited on a receiving surface, such as a conveyor which advances the layer step by step in amounts approximating equal multiples of the entire width of the layer and substantially the width of the trough of the cross feed conveyor to a cutting station where strips are cut from the layer and delivered at specified times to the cross feed of a cigar bunch forming mechanism.

The requirements of the cigar bunch forming machine control the operation of the associated magazine and its operating elements, the layer delivery conveyor and the cross feed, so that the advance of the substantially continuous stream on the cross feed conveyor takes place whenever the quantity of tobacco in the cigar bunch forming machine falls below a predetermined minimum. The length of tobacco strips cut from the broad layer of tobacco being advanced by the delivery conveyor beneath the magazine is generally sufficient to form several bunch lengths. For that reason the cross feed conveyor which supports the substantially continuous stream of tobacco is operated a plurality of times for each operation of the wide layer feeding conveyor which delivers the advancing edge of the broad layer of tobacco supported thereon to a strip cutting station in order that strips may properly be cut therefrom. As indicated hereinabove, each bunch length cut from the stream of filler tobacco in the cross feed is associated in superimposed relationship to form a column of bunch lengths from which measured bunch charges are removed for formation into bunches. From this it follows that any irregularities in thickness of the original layers of tobacco delivered by the magazine tray supporting bars to the tray receiving and delivery conveyor are automatically averaged out and at all times, by means of the automatic filler feeding mechanisms constituting this invention which are driven in proper timed relation, very uniform bunches are produced.

It is an object of my invention to provide a cigar machine consisting of an automatic filler feed, and means for operating the automatic filler feed in conjunction with a cigar bunch forming machine in such a manner that all operations incident to the feeding of filler tobacco and formation into bunch form resulting in substantially uniform long filler cigar bunches are performed automatically.

It is a further object of my invention to provide an automatic long filler feeding mechanism for a cigar machine in which a plurality of layers of substantially uniform area are located in a magazine and intermittently fed therefrom for formation into a stream of tobacco moving to a cigar bunch forming machine.

My invention also consists in the provision of a cigar machine provided with an automatic long filler feed mechanism, a cross feed, and a bunch charge forming and rolling mechanism, all of which are connected for conjoint operation in the automatic production of cigar bunches.

My invention also consists in the provision of an improved automatic cigar filler feed mechanism in which a plurality of layers of tobacco of substantially uniform area are assembled within a confining magazine and intermittently fed therefrom to interconnected and synchronized feeding and bunch forming mechanisms for formation into cigar bunches.

It is a further object of my invention to provide a source of supply of long filler tobacco in the form of tray supported superimposed layers of generally quadrilateral form in plan so arranged that layers of tobacco are made available in succession, advanced stepwise to a strip cutting station where predetermined relatively narrow strips are cut therefrom, and formed into a substantially continuous stream of tobacco which is advanced to a cigar bunch forming machine and made available for formation into substantially uniform cigar bunches.

My invention also consists in mechanism for feeding a relatively broad layer of prearranged filler tobacco with the leaves and/or portions thereof extending in the same general direction and of substantially quadrilateral form in plan and so handling the layer of tobacco being fed that at all times the leaf arrangement thereof is undisturbed from the time it is made available in the machine for feeding until the layer is completely cut into portions of substantially uniform predetermined width and delivered to bunch forming mechanisms in a cigar bunch forming machine.

My invention also contemplates the provision of an automatic long filler feeding mechanism with a cross feed and cigar bunch forming machine and control devices therefor which determine the amount of tobacco to be fed from the feeding mechanism and then the cross feed to the cigar bunch forming machine.

My invention also consists in the provision of apparatus for forming cigar bunches wherein layers of spread out flat leaves and/or portions thereof are cut into relatively long strips. The strips are associated to form a substantially continuous stream of long filler tobacco from which are cut bunch lengths of tobacco and formed into a column of tobacco wherein because of the manner in which the tobacco is handled the column of tobacco tends to approximate a stack of sheets, thereby allowing bunch charges to be separated with a minimum of formation of scrap and small particles which will be present in the finished bunch.

My invention also consists of the provision of a cigar bunch forming machine having mechanism for forming a column of measured bunch lengths of tobacco and a control device associated with the column forming mechanism for operating an automatic long filler feeding device which is synchronized for operation with a cross feed delivering a substantially continuous stream of filler tobacco to the cigar bunch forming machine.

With these and other objects not specifically mentioned in view, the invention consists in certain combinations and constructions which will be hereinafter fully described, and then set forth in the claims hereunto appended.

In the accompanying drawings which form a part of this specification, and in which like characters of reference indicate the same or like parts:

Figures 2 and 2a are partial end elevations which if joined along line B—B disclose an end elevation of the same interconnected and synchronized for conjoint operation with the cross feed of the cigar machine taken on line 2—2 of Figure 1a;

Figure 3 is a sectional end elevation of the tobacco filler feed taken on line 3—3 of Figure 1a;

Figures 4 and 4a are partial plan views partially in section which when joined along line C—C illustrate a sectional plan view of an automatic cigar machine constructed in accordance with the invention, showing the tobacco feed belt of the automatic filler feed and its connection with the cross feed channel and cross feed, the charge cutting and transfer means, and the bunch rolling device;

Figure 6 is a rear view of the tobacco feed belt drive of the automatic filler feed mechanism and indexing device therefor;

Figure 7 is a sectional end elevation of the same, taken on line 7—7 of Figure 6;

Figure 8 is a plan view of the automatic filler feed mechanism feed belt drive and indexing device, as seen from line 8—8 of Figure 6;

Figure 9 is an end elevation of the same taken from line 9—9 of Figure 6;

Figure 10 is a rear view of the tray conveyor drive and indexing device of the automatic filler feed mechanism;

Figure 11 is a sectional end elevation of the same taken on line 11—11 of Figure 10;

Figure 12 is a partial sectional end elevation of the indexing device taken on line 12—12 of Figure 10;

Figure 13 is a plan view of the automatic clutch controls for the filler feed and feed belt drives of the automatic filler feed mechanisms;

Figure 14 is a sectional side elevation of the filler feed drive control, taken on line 14—14 of Figure 13;

Figure 15 is a sectional end elevation, taken on line 15—15 of Figure 16, of a detail of the tray pusher and guide construction of the automatic filler feed mechanism;

Figures 16, 17 and 18 are cross sectional views illustrating the successive steps of transferring the tobacco layer from the tray onto the feed belt and ejecting empty trays from the machine;

Figure 19 is a partial plan view of one of the filler tobacco supporting trays;

Figure 20 is a partial end view of the same;

Figure 21 is a partial sectional front elevation illustrating the relation of the tobacco feed belt of the automatic filler feed mechanism with the cross feed channel of the cigar machine which is interconnected therewith for synchronized coaction;

Figures 22, 23 and 24 illustrate successive steps in cutting a strip from the advancing edge of a tobacco layer on the feed belt, and disposing the cut strip in the cross feed channel;

Figure 25 is a side elevation of the cigar machine cross feed;

Figure 25a is an enlarged detailed view of the feed belt control mechanism;

Figure 26 is a side elevation, partly in section, of the bunch rolling table and its associate mechanism;

Figure 27 is a partial sectional end elevation of the measuring chamber and charge transfer of the cigar machine cross feed showing the knife during cutting operation; and Figure 28 is a sectional end elevation of the rider plate coupling mechanism taken on line 28—28 of Figure 27.

Figure 1:
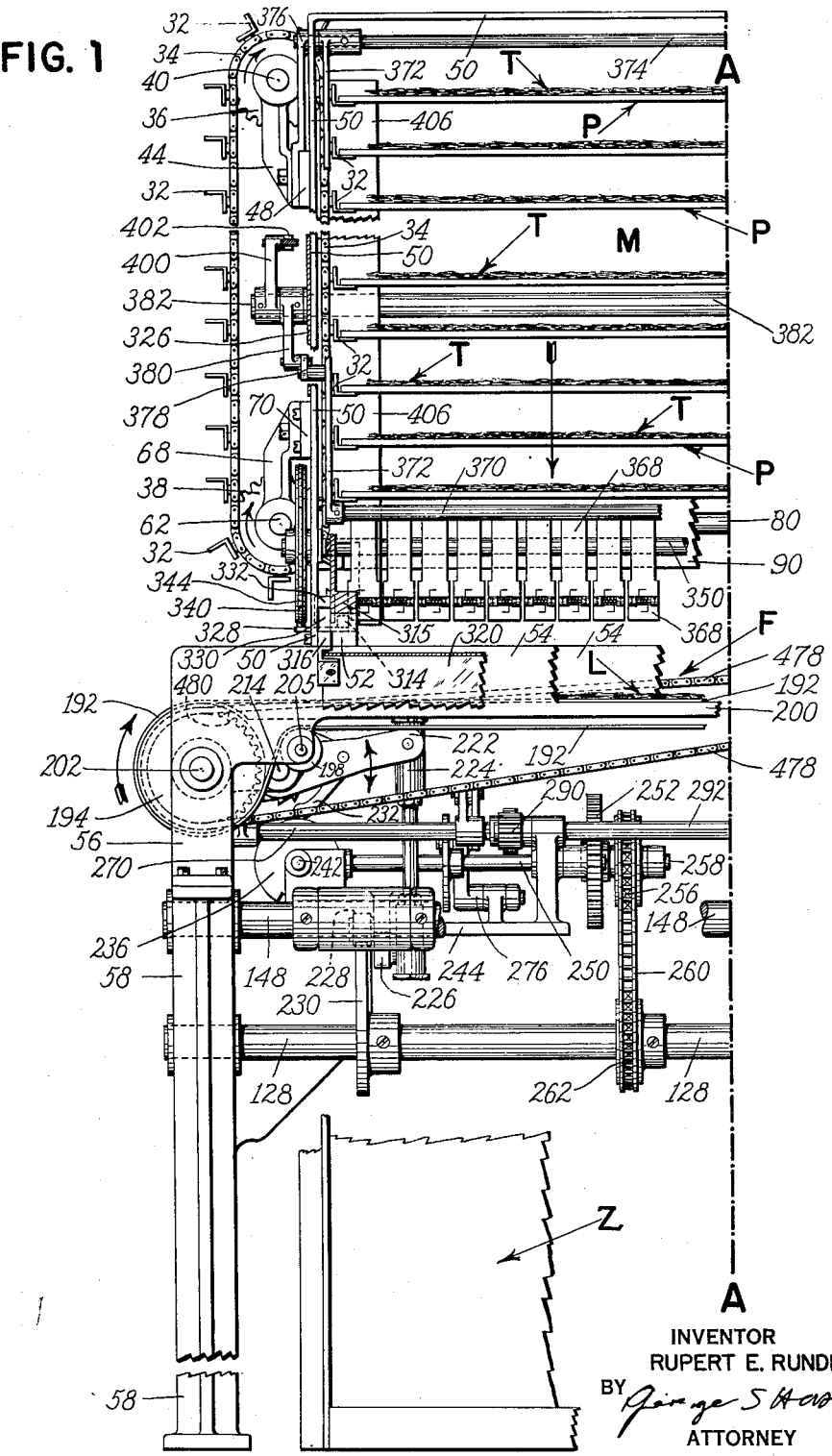
Figures 1 and 1a are partial side elevations which if joined along line A—A disclose an automatic filler cigar feeding mechanism constructed in accordance with the invention.

Referring to Figures 1 to 4, inclusive, the preferred embodiment of the invention illustrated consists of an automatic filler feed which includes a magazine M, and an automatic tobacco filler feeding mechanism F which feeds tobacco intermittently into a cross feed channel U of a cross feed H after a strip S is cut from each layer of tobacco L fed intermittently from the feeding mechanism F of the magazine M in order to form a stream of shingled strips S on the cross feed belt which delivers the tobacco to a synchronized bunch charge cutting and forming mechanism in order to complete the automatic feeding and cigar bunch forming operations.

Magazine M is adapted to contain a number of plates or trays P which are stacked one above the other therein. Each tray P is provided with a layer of tobacco leaves T of substantially uniform area, although the thickness of each layer may vary somewhat one from another. In Figure 4, which shows the preferred leaf arrangement of tobacco layers L, the major axis of each piece of tobacco is positioned generally at right angles to the major axis of each layer L. The trays P are inserted horizontally into the magazine M where each tray is supported at its opposite edges by means of supporting bars 32, each of which is suitably affixed to a pair of vertically positioned endless chains 34. The supporting bars 32 preferably are securely spaced along the chains 34 and are so arranged that each spaced opposed set of bars supports one tray in substantially horizontal position in the magazine M. Chains 34 run upon idler sprockets 36 and driving sprockets 38. Since each bar 32 is attached to two spaced chains 34, two sets of sprockets 36, 38 are provided for each chain.

Upper sprockets 36 are fixed to shafts 40, 42 (Figures 1, 1a) mounted in brackets 44, 46 fixed to cross bars 48 on the magazine frame. Lower sprockets 38 are secured to shafts 62, 64 supported in bearing brackets 66, 68 secured to cross bars 70 on the magazine frame 50 which is mounted on a pair of lower cross bars 52 fixed to side walls 54 of the filler feed supporting frame 56 held by frame brackets 58, 60 (Figures 1, 1a, 2 and 3).

On the rear ends of shafts 62 and 64 are secured bevel gears 72, and 74, respectively, which mesh with bevel gears 76, 78, respectively, mounted on shaft 80 supported in bearing brackets 86, 88 secured to a frame bracket 90 attached to the rear uprights of the magazine frame 50. Shaft 80 carries a gear 82 intermittently driven by a gear 84 (Figures 10 and 12) preferably formed integrally with a Geneva wheel 92 loosely mounted on shaft 94 supported in bearing brackets 86. Geneva wheel 92 is actuated by means of a roller 96 carried by arm 98 fixed to shaft 100, also supported by bearing brackets 86.

Shaft 100 has secured thereto a sprocket 102 (Figures 10 and 11) driven by means of a chain 104 running on driving sprocket 106 secured to shaft 108 supported in a bracket 110 fixed to the bed plate 112 of the adjoining cigar machine.

Figure 1A:
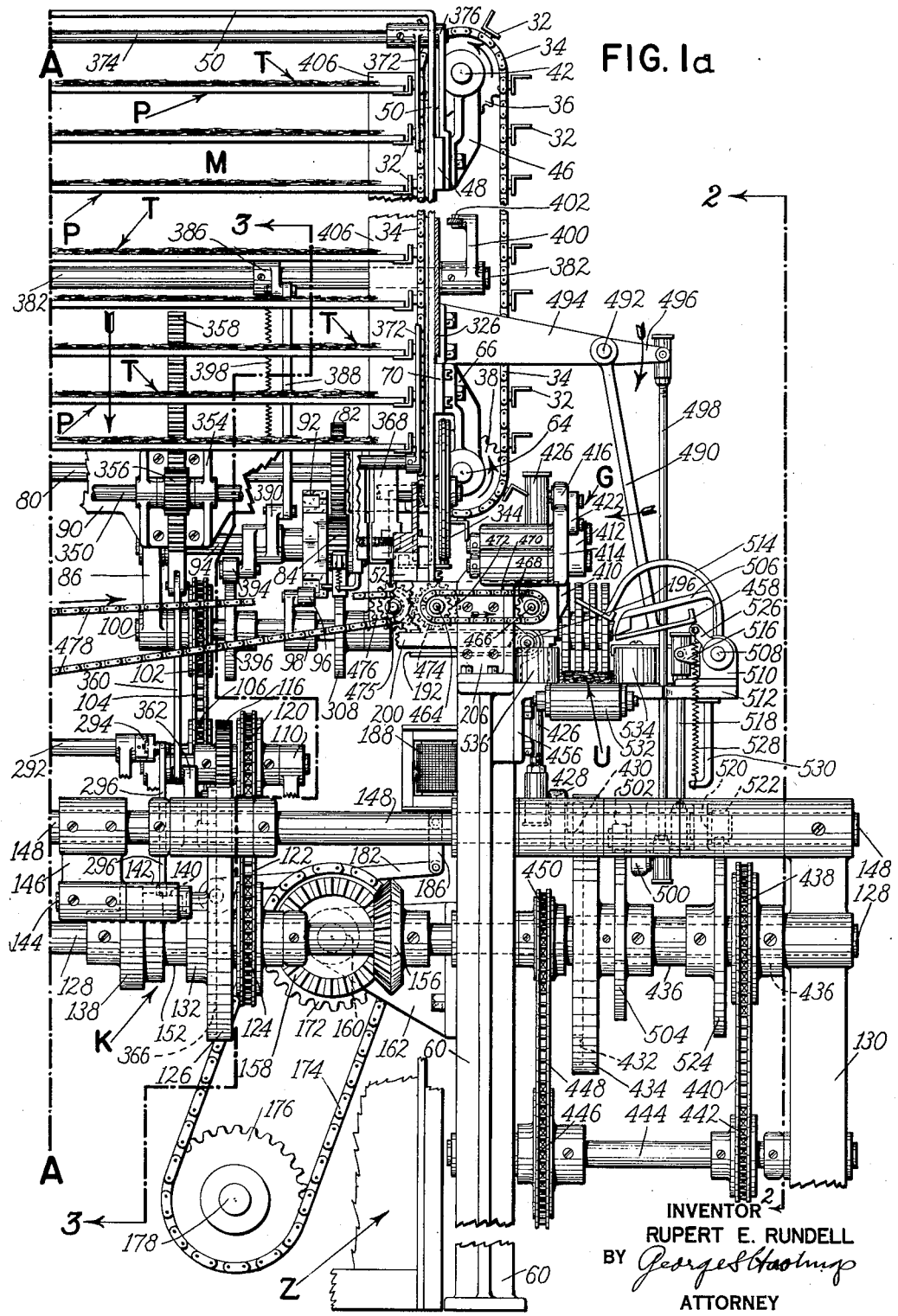
Figure 2A:
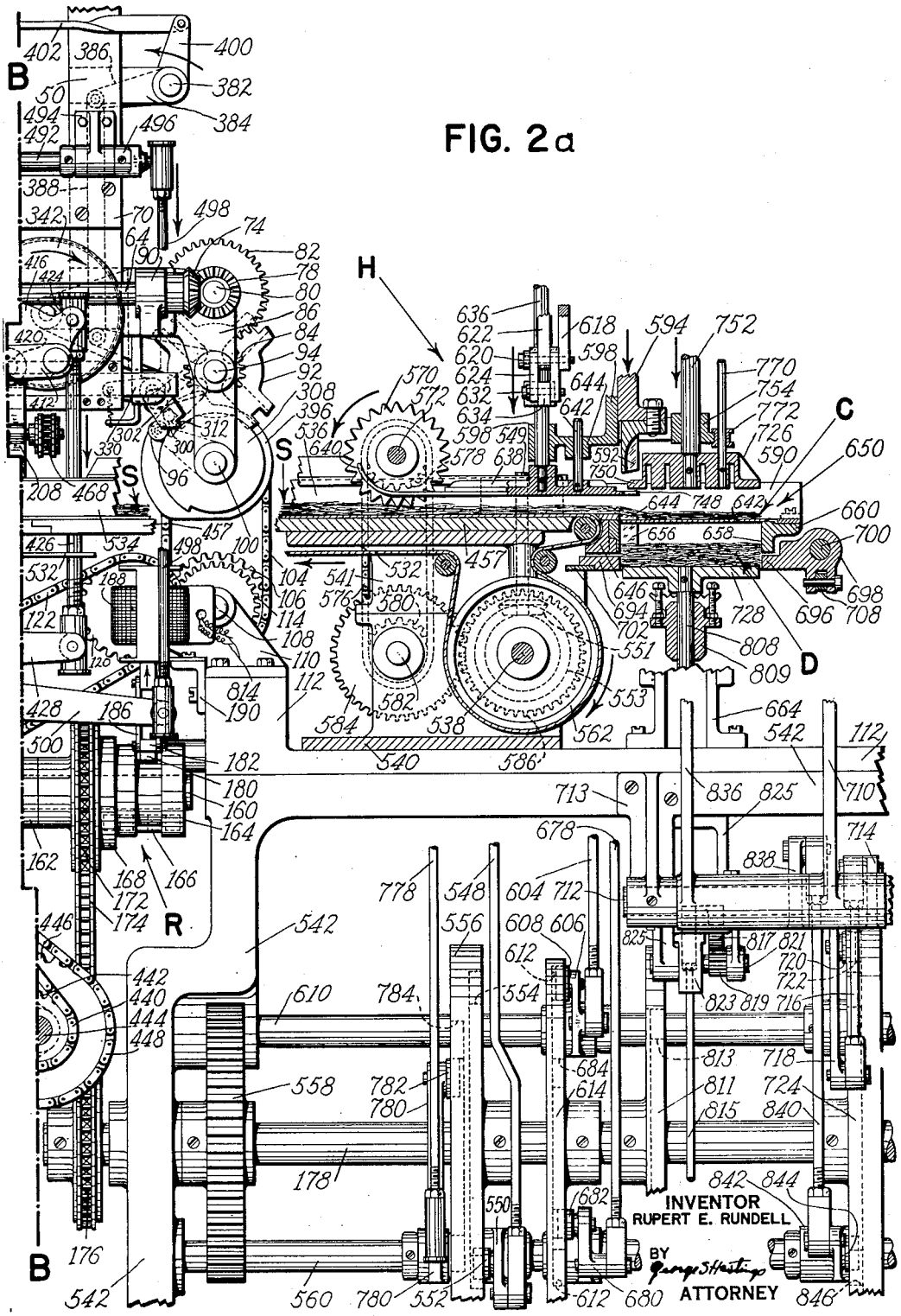
Figure 3:
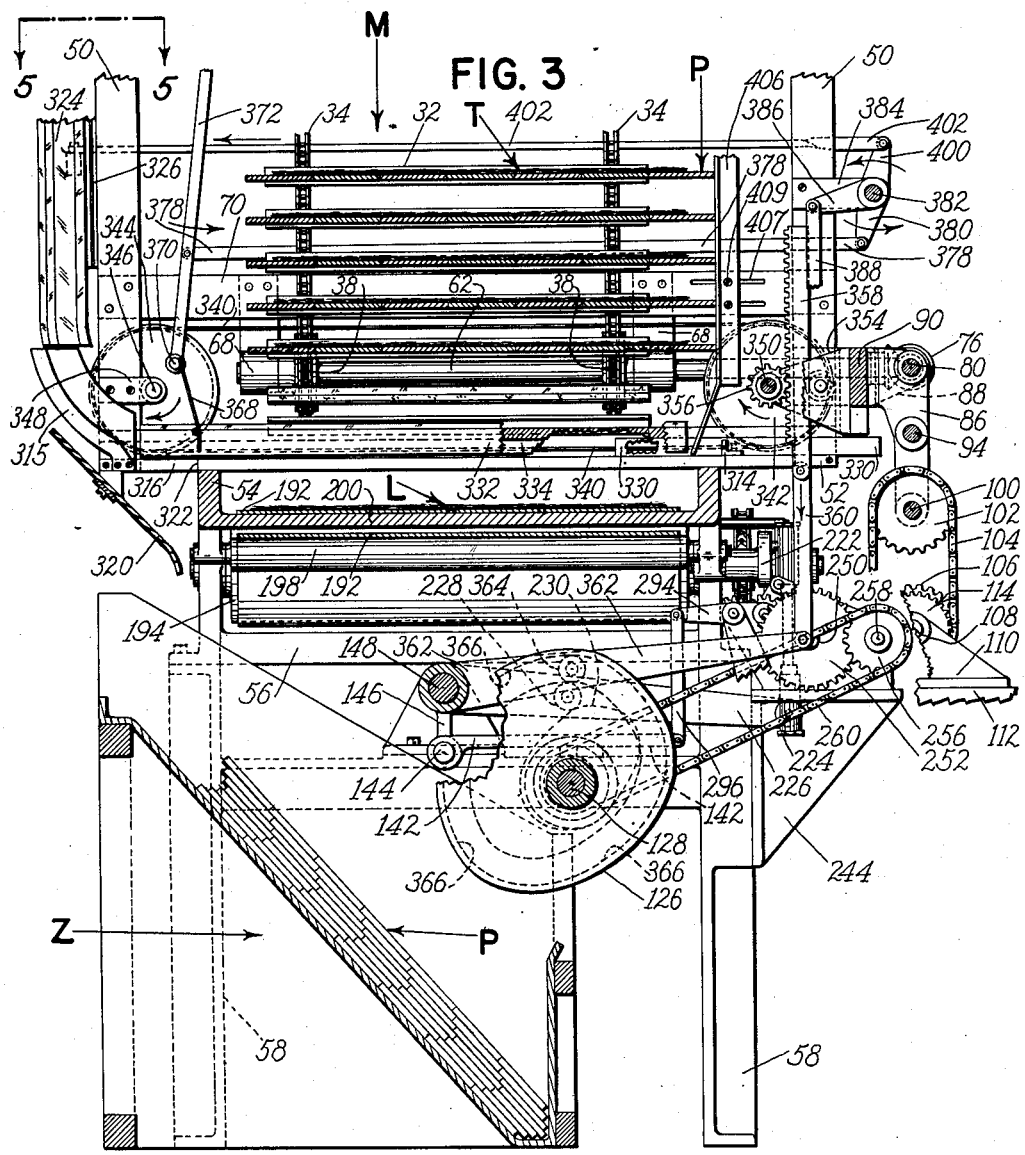

Fixed to shaft 108 is a gear 114 meshing with gear 116 (Figure 11) mounted on a shaft 118 also supported by brackets 110. This shaft carries a sprocket 120 which, by means of a chain 122, is driven from sprocket 124 (Figures 1a, 2 and 13) which may be formed integrally with a cam 126. The latter, as well as sprocket 124 are loosely mounted on the filler feed cam shaft 128 supported by suitable bearings in frame brackets 58, 60 and 130 (Figures 1 and 1a). Fixed to cam 126 is the male portion 132 of a sliding key clutch K provided with a spring pressed slidable key 134 which is adapted to project into a slot 136 formed in the female portion 138 fixed to shaft 128 (Figures 3 and 13). The cooperation between parts 132, 134 and 136 and 138 is such that so long as key 134 engages slot 136, the clutch parts are in driving relationship. Clutch K is thrown out of operation by means of a wedge shaped lug 140 carried by arm 142 pivoted on a stud 144 mounted in a lug 146 attached to shaft 148 fixed in frame brackets 58, 60 and 130. When arm 142 is raised, clutch K, due to the pressure of spring 150 upon key 134, remains in driving relationship. When arm 142 is lowered so that lug 140 thereon contacts the bottom of the clutch track 152 and is positioned in the path of key 134 which extends across track 152 (Figure 13), the wedge shaped face of lug 140 engages with a corresponding wedge shaped cut-out of key 134 and effects a retraction of key 134 from slot 136 to disconnect the drive of the clutch.

Shaft 128 is driven by means of bevel gear 156 meshing with bevel gear 158 mounted on shaft 160 supported in bearing bracket 162 extending from frame bracket 60. Shaft 160 may be driven by means of a sliding key clutch R of the same general construction as clutch K. This clutch consists of a male portion 164 which is mounted on the end of shaft 160 and which carries a sliding key 166. A female member 168, provided with a slot 170, is secured to a sprocket 172 loosely mounted on shaft 160. Sprocket 172 is driven continuously by a chain 174 running on sprocket 176 mounted on the continuously rotating cam shaft 178 of the cigar machine. The drive of shaft 160 is incapacitated by throwing out clutch R which is effected by means of a wedge-shaped lug 180 fixed to the lower side of an arm 182 pivoted to a stud 184 secured to the side of the cigar machine bed plate 112 (Figures 1a, 2a, 13 and 14). The free end of arm 182 is connected by means of a pair of links 186 to the armature of the solenoid 188 which moves lug 180 into and out of declutching arrangement with respect to clutch key 166. Solenoid 188 may be mounted on a bracket 190 attached to the wall of bed plate 112. The timing and operation of the solenoid 188 is described more in detail hereinafter.

In the embodiment selected for purposes of illustration, the tobacco feed mechanism F which operates in conjunction with the tray conveyor of magazine M includes a wide substantially horizontal feed belt 192 extending adjacent the bottom of magazine M (Figures 1, 1a and 3). Belt 192 runs on an intermittently driven roller 194, an idler roller 196 and a take-up roller 198. The tobacco supporting lap of belt 192 between rollers 194 and 196 preferably is supported by a table plate 200 which connects the side walls 54 of the filler feed frame 56. Rollers 194, 198 are mounted on shafts 202, 205, respectively, supported in suitable bearings formed in filler feed frame 56. Roller 196 is rotatably mounted on shaft 404 (Figure 21) supported in bearings in brackets 206 and 208 (Figures 1a and 4) attached to side walls 54 of frame 56 and mounted on frame bracket 60.

Shaft 202 of roller 194 is driven intermittently by means of a gear 210 secured thereto (Figures 6, 8 and 9) meshing with a gear 212 loosely mounted on stud 214 (Figures 6 and 8) held by frame 56. Gear 212 may be formed integral with a ratchet 216 which is actuated by a pawl 218 pivoted on a stud 220 on an oscillating arm 222 loosely mounted on stud 214 which arm through an adjustable connecting rod 224 is connected to a cam lever 226 (Figures 1 and 3) loosely mounted on the cam lever supporting shaft 148. Cam lever 226 carries a cam follower 228 engaging a cam 230 mounted on the filler feed cam shaft 128. Pawl 218 is provided with a suitable control finger 232 (Figure 6) which is urged by spring 234 into engagement with cam 236 on shaft 242. When riding on the high portion 238 of cam 236, pawl 218 is prevented from engaging the ratchet 216. However, when control finger 232 tracks cut-out portion 240 of cam 236, pawl 218 engages ratchet 216 and due to the oscillating motion of arm 222, a forward movement of feed belt 192 is effected in an amount necessary to advance a predetermined length of the layer of tobacco being fed to a cutting position above the cross feed channel U described more in detail hereinbelow. Shaft 242 (Figures 6 and 9) is supported in suitable bearing lugs 243 of a bracket 244 mounted on a vertical flange projecting from the rear leg of frame bracket 58. Shaft 242 is continuously driven by means of a bevel gear 246 meshing with a bevel gear 248 secured to shaft 250 also supported in bearing lugs 243 of bracket 244. Shaft 250 is driven continuously by gear 252 meshing with gear 254 which may be formed integrally with sprocket 256 loosely mounted on stud 258 fixedly supported in a lug 259 on bracket 244, and driven by chain 260 running on sprocket 262 (Figure 1) on cam shaft 128.

The transfer of tobacco layers T from the plates or trays P supported by bars 32 in magazine M is effected by the successive delivery of the lowermost tobacco loaded plate P onto spaced cross bars 52 from which each plate in turn is ejected from the machine by a pusher mechanism described in detail hereinafter. As each plate or tray P is ejected from the machine, the tobacco layer thereon is stripped therefrom and deposited upon feed belt 192, which as mentioned hereinbefore, is advanced step by step a predetermined distance in order to move the layer L or portion thereof edgewise in the direction shown by the arrows in Figure 4 and locate each predetermined width or strip of tobacco in position to be cut therefrom and deposited in the cross feed channel U.

As mentioned hereinabove, the layers of filler tobacco T supported by plates or trays P are substantially uniform in area, that is, in length and breadth, and preferably are of quadrilateral form in plan. It is also desirable that the layers be substantially the same in thickness. In the operation in which tobacco layers T are stripped from trays P, it is important that each layer be deposited upon belt 192 in substantially the same condition and layer arrangement as when each layer was supported by a tray P. For that reason, as will be evident from the following description, mechanism is provided to insure proper handling of each layer laden tray, and each layer itself both before, during and after removal from a tray P. When all of the filler tobacco constituting a layer T has been fed, cut into strips of uniform and predetermined width, and delivered into the cross feed, the next loaded tray P is subjected to the operations mentioned hereinabove, and the automatic feed of filler tobacco continues. The several pairs of bars 32 of the magazine may all be loaded with trays or plates P at one time, or if desirable loaded trays P may be placed thereon from time to time as the machine operations proceed. The operation of the tray conveyors and drives, therefore, and the tray ejecting and stripping mechanisms is so timed that as soon as one layer of tobacco L on belt 192 is exhausted, a new layer is deposited thereon, and the empty tray P discharged from the machine.

In the illustrated embodiment of the invention, the timing of the tray conveyor drives, and the ejecting and stripping mechanisms is controlled by disc 264 (Figures 6, 8 and 9) provided with a locking notch 266 (Figure 6). Disc 264 is mounted on shaft 202 and turns intermittently with pulley 194. A hook shaped control finger 268 is adapted to engage notch 266 at the proper time or when the supply of tobacco on belt 192 or the layer being fed has been exhausted. Control finger 268 is fixed to a shaft 270 supported in bearings in lugs 259 and 271 on bracket 244, and is so located relative to disc 264 that it can be rocked into and out of engagement with notch 266. Shaft 270 is rocked to move nose 269 of finger 268 out of notch 266 by means of an arm 272 (Figures 6, 7 and 8) connected by link 274 to a lever 276 mounted on stud 278 loosely supported by a lug 279 on bracket 244. Lever 276 is provided with a cam follower 280 urged by spring 282 into tracking engagement with cam 284 on shaft 250. The movements of disc 264 and cam 284 are so synchronized that after a predetermined number of intermittent movements of shaft 202, governed in accordance with the length of a layer L being fed, and the width of a section or strip cut from its advancing edge, the layer is exhausted, and notch 266 of disc 264 is located in position to be engaged by nose 269 of hook shaped mmeber 268. Substantially at this moment, the low portion 286 of cam 284 is located beneath cam follower 280 and tension spring 282, fixed at one end to lever 276 and at its other end to a hook 281 in side wall 54, causes shaft 270 to rock and effect the movement of nose 269 into engagement with notch 266. Shaft 270, which at this time is turned in a clockwise direction, as viewed in Figure 7, during the movement of nose 269 into notch 266, is also provided with a gear 288 meshing with a gear 290 keyed to shaft 292 supported by lug 259 on bracket 244. A lever 294 fixed to shaft 292 is connected by link 296 to clutch control lever 142 referred to hereinabove (Figure 13). Movement of nose 269 into notch 266 therefore causes clutch control lever 142 to be lifted, whereupon spring 150 forces key 134 of male portion 132 of clutch K into notch 136 of female clutch portion 138 thereby starting the rotation of sprocket 124 which through chain 122 and connecting parts described heretofore, cause arm 98 to rotate in the direction of the arrow (Figure 12) into a slot 93 in Geneva wheel 92, which through the connections described heretofore, effects the turning of the tray conveyor operating shafts 62 and 64, and sprockets 38 secured thereto. This movement causes the lowermost tray supporting bars 32 to incline downwardly and away from each other whereupon the layer loaded tray P supported thereby drops onto stationary cross bars 52 supported on side walls 54.

In order to prevent the tray conveyors from running during the operation of the machine, except when a loaded tray is to be delivered to cross bars 52, each arm of Geneva wheel 92 is provided with a notch 298 adapted to be engaged at the end of each Geneva wheel turning movement with a lock pin 300 (Figure 12) carried by a spring mounted bell crank lever 302 pivoted on a stud 304 held in a lug 306 on frame bracket 90. The lock pin 300 is disengaged from the notch 298 only during the movement of the Geneva wheel 92 by means of a cam disc 308 which is mounted on shaft 100 and turns with the Geneva wheel operating arm 98. Disc 308 is provided with a step 310 which engages with a step 312 provided at the free end of bell crank lever 302 just before follower 96 on arm 98 engages with the Geneva wheel, and holds pin 308 out of engagement with notch 298 until follower 96 runs out of the engaged slot 93 in Geneva wheel 92.

The operation of the tray ejecting device is so timed that substantially as soon as a tobacco loaded tray is positioned on cross bars 52, a pair of pusher lugs 314 (Figures 3, 4 and 15) advance, engage the rear edge of the tray (Figure 16), push it along bars 52 transversely of belt 192 out of the magazine M, and into a tray receiving guide which may consist of a pair of stationary curved guide rails 315, each of which is attached to the protruding front end 316 of cross bars 52.

Trays P may be formed from any suitable relatively thin material such as wood or metal, composition or combinations thereof. In the embodiment selected for purposes of illustration, the trays are flexible in order that they may bend or bow in being ejected from the machine and deposited with their opposite edges engaged by curved portions of guide rails 315. Trays P are assembled in side by side relationship from a plurality of narrow strips 317 of proper length (Figures 19 and 20) held together by means of a suitable number of flat spring steel bands 318. This construction results in trays having considerable flexibility which enables the edges thereof to be pushed by lugs 314 into and along curved guide rails 315 and 324 (Figure 17) where each tray is delivered substantially in vertical position (Figure 18).

The ends 316 of bars 52 protruding over the front edge of side wall 54 are narrower than the major part of bars 52, and offer no support to a tray being ejected from the magazine M, so that each tray P drops from between rails 324 upon a suitably mounted stationary guide plate 320 which directs it into a collector box Z for further use. As mentioned hereinabove, pusher lugs 314 which engage the rear edge of a loaded tray push it to the front edges 322 of bars 52 where the rear tray edge loses its bottom support, and pusher lugs 314 come to a momentary rest. Due to the action of the flat spring steel bands 318 which secure strips 317 together in tray form, the rear edge of a tray P snaps downward as it leaves the front edges of bars 52 thereby tending to straighten the tray, which descends by gravity, guided by plate 320 into collector box Z (see dotted position in Figure 18).

Figure 5:
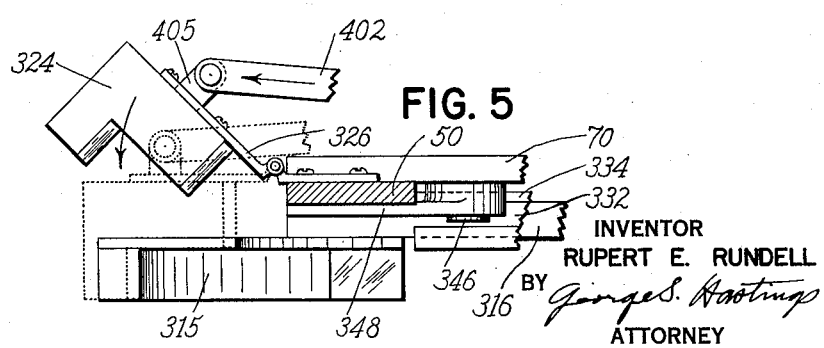
Figure 5 is a sectional plan view of a detail of the hinged tray guide channels of the filler feed as seen from line 5—5 of Figure 3.

Each curved tray guide rail 315 is provided with a vertical extension 324, preferably movably mounted by means of hinges 326 secured to each front upright of magazine frame 50. Rail extensions 324 are swung into aligned relationship with corresponding stationary rails 315 fixed to ends 316 of bars 52 during the tray ejecting period; but remain in open position (Figure 5) during the operation of the machine in order to enable the operator from time to time or when desired to refill the tray magazine M with loaded tobacco trays without obstruction and interference.

In the illustrated embodiment, two pusher lugs 314 are employed for ejecting trays P from the magazine in order to remove and deposit layers of tobacco T in succession on belt 192 without materially disturbing the tobacco layer arrangement or condition. Since the operative connections of each lug are the same, only one is described. Referring to Figures 4 and 15, lug 314 may be formed integrally with a plate 328 secured by screw 329 to bar 330 slidable on cross bar 52 between spaced channel forming members 332, 334. Member 334 is attached to member 332 which is supported by uprights 50.

Each of the pusher carrying plates 328 has secured thereto a post 336 which is attached by a screw 338 to a cable 340 wound around and attached to cable drum 342 and extending over an idler pulley 344. Each idler pulley 344 is rotatably mounted on a stud 346 held (Figure 3) supported in a lug 348 secured to each of the two front uprights of frame 50. The two drums 342 are mounted on an oscillating shaft 350, supported in two bearing lugs 352 secured to the rear frame uprights and a bearing bracket 354 mounted on frame bracket 90. Shaft 350 carries a gear 356 actuated by a rack 358 connected by link 360 to an end of cam lever 362 loosely mounted on shaft 148 and provided with a cam follower 364 running in cam track 366 of cam 126, loosely mounted on shaft 128 as mentioned hereinabove. Since pusher lug operating cam 126 forms part of clutch K, the former starts immediately to turn upon engagement of the latter, but it is essential first that chain 122 actuate the tray conveyor, as described heretofore, in order that a tobacco filled tray P may be delivered onto cross bars 52 before pusher lugs 314 begin to eject a tray and move it into guide rails 315, 324. Therefore, cam track 366 in cam 126 is provided with a dwell which controls the movement of pusher lugs 314 until a tray is dropped in the described manner after which pusher lugs 314 push against the rear edges of the newly delivered tray P and eject it from the machine. Upon completion of the removal of a tray and delivery of the layer of tobacco T carried thereby upon belt 192, pusher lugs 314 actuated by means of drums 342, 344, cables 340 and rack 358 are returned to their original positions.

During the relatively rapid forward motion of a tray P by pusher lugs 314, the tobacco layer T carried thereby is pushed or stripped therefrom by a row of stripper fingers 368 provided with hinged ends which project into the path of and contact the top surface of a tray as it passes therebeneath on being ejected from the machine. The tobacco layer T is deposited on belt 192, as described hereinabove, in substantially the same condition and arrangement as when supported by a tray P. It is evident, therefore, that this manner of handling long filler tobacco tends greatly to insure proper position and alignment of leaves and/or portions thereof during all feeding operations, and hence contributes much to the final formation of very uniform bunches.

Fingers 368 are mounted on a cross rod 370 secured at its ends to arms 372 fastened to a shaft 374 (Figures 1 and 1a) mounted in bearing brackets 376 secured to cross bars 48. In order to secure uniform positioning of all layers of tobacco stripped from the trays onto the feed belt in the continuous operation of the machine, arms 372 impart a slight forward motion to fingers 368 to the desired positioning line immediately after a tray P has dropped upon cross bars 52. Fingers 368 remain in this position during the tobacco stripping action, but return to their original position after the completion of the same.

Forward motion is imparted to arms 372 by means of a link 378 pivotally connected to one of the arms 372 (Figures 1 and 3) and lever 380 mounted on an oscillating shaft 382 supported by a pair of bearing lugs 384 secured to the rear frame uprights 50. Shaft 382 is actuated by a lever arm 386 (Figures 1a and 3) connected by link 388 to an arm 390 mounted on shaft 94 (Figure 10) fulcrumed in bearings in bracket 86. The hub of arm 390 is provided with a cam lever 392 carrying a cam follower 394 engaging with a cam 396 mounted on the tray conveyor operating shaft 100. A suitable tension spring 398 connected to lever arm 386 and frame bracket 90 assures a steady contact of roller 394 with cam 396. On each end of oscillating shaft 382 is also mounted an arm 400 (Figures 1, 1a and 3), each of which is connected by a link 402 to a lug 405 (Figure 5) projecting from tray guide rail extensions 324. The latter, as mentioned heretofore, are moved into alignment with the stationary rails 315 during the tray ejecting period and are moved out of alignment therewith after each tray ejection by means of arm 400 on oscillating shaft 382.

In order to provide a stop for rear edges of trays inserted into tray magazine M, and also to provide a guide for downwardly moving trays when released from the supporting bars 32, a pair of vertical stop and guide bars 406 are secured towards the rear portion of cross bars 48 and 70. Stops 406 preferably are mounted adjustably on side frame bars 70 provided with slots 407 through which projects bolts 409 secured in adjusted position by suitable nuts (not shown). This adjustment makes possible the use of different sizes of trays, and also allows more control in the positioning of tobacco layers L on belt 192.

As mentioned heretofore, each tobacco layer L on feed belt 192 is intermittently forwarded to a cutting device G where mechanism operating intermittently and in synchronism with feed belt 192 and the bunch rolling machine cuts successive predetermined widths or strips S from each tobacco layer advanced edgewise by belt 192 into the range of action of knife 410. Mechanism is also provided for depositing each strip as cut properly in a generally U-shaped cross feed channel of the cross feed H of the cigar bunch rolling machine. Due to the fact that each strip cut from a layer L is of a width to fit readily between cross feed conveyor belts 534, 536, and because of the flat, laminated arrangement of the tobacco leaves and/or portions thereof constituting each strip, each strip deposited on conveyor 532 lies substantially flat and laminated thereon, during the movement of the tobacco stream to the bunch length cutter 592 described more in detail hereinafter.

Cutting device G (Figures 1a, 2, 2a and 21) in the embodiment illustrated consists of a knife 410 secured to a knife supporting bar 412 which is pivoted at its ends to knife operating levers 414, 416. Lever 414 is secured to a stud 418 supported in bracket 206, and lever 416 is secured to a stud 420 supported in bracket 208. Levers 414 and 416 are connected by means of a link 422. Lever 416 is provided with a projection 424 (Figure 2a) to which is pivoted an end of an adjustable connecting rod 426, the other end of which is pivoted to the end of a cam lever 428 loosely mounted on cam lever supporting shaft 148. Cam lever 428 carries a cam follower 430 engaging a cam track 432 of a cam 434 secured to a sleeve 436 loosely mounted on the filler feed cam shaft 128. Sleeve 436 carries a sprocket 438 (Figure 1a) which is driven through a chain 440 by sprocket 442 secured to shaft 444 carrying another sprocket 446 which through a chain 448 is driven by a sprocket 450 mounted on the filler feed cam shaft 128.

Sleeve 436 with the speed reducing means just described, is employed for the purpose of synchronizing the knife action of cutting device G with the movement or feeding action of feed belt 192. That is, a strip of predetermined width, substantially the width of the cross feed channel is fed after one or more step by step movements of the cross feed belt in advancing a stream of shingled strip lengths to the bunch length cutter for deposit in superimposed relation in columnar formation in the bunch charge forming mechanism. As shown for purposes of illustration only, feed belt 192 advances a strip length once every three step by step movements of cross feed belt 532. Suitable adjustments can be made as desired by substituting different sizes of sprockets for sprockets 438, 442, 446 and 450. It is evident, therefore, that belt 192 does not necessarily operate during each cycle of the cross feed H, the action of which will be disclosed later on. The feeding action of feed belt 192, therefore, is set and predetermined in accordance with the thickness of the tobacco layer L forwarded by belt 192 and the length of charge required for making a bunch of a desired length.

Knife 410 coacts with a ledger plate 452 (Figures 2 and 21) mounted on a suitable bridge bar 454 secured to bracket 456 attached to the upper portion of frame bracket 60. Bracket 456 also supports the greater portion of the U-shaped cross feed channel U extending from the cross feed H of the cigar machine which is mounted adjacent bridge bar 457 and runs at right angles to the filler feed belt 192. As mentioned heretofore, the layer of tobacco leaves L is advanced a distance substantially equal to the width of the cross feed channel U after which a strip substantially equal to the width fed is cut therefrom by means of knife 410.

In order to prevent the advancing end of the tobacco layer which extends over the cross feed channel from bending or partly dropping into channel U which would cause a disarrangement of the leaves in the tobacco layer L, a bridge plate 458 swings over channel U (Figure 22) into a position proximate the edge of ledger plate 452 thereby providing an even substantially horizontal support for the advancing portion of tobacco layer L. Since the tobacco leaves or portions thereof forming the layer L may have a tendency to telescope when a strip is cut and delivered by feed belt 192 and moved over the ledger plate 452 upon bridge plate 458, a revolving star shaped roller 460 and a plurality of equally spaced star wheels 462 engage the top surface of the layer and strip to be cut therefrom and prevent any substantial disturbance or disarrangement thereof.

Star shaped roller 460 is mounted on a shaft 464 and star wheels 462 are secured to a shaft 466 (Figures 1a, 4 and 21) having mounted on its ends sprockets 468, connected by chains 470 running on sprockets 472 mounted on the ends of shaft 464. Shaft 464 also carries and is driven by a gear 474 meshing with a gear 475 provided with a hub on which is mounted a sprocket 476 (Figures 1a and 4) driven intermittently by a chain 478 running on a driving sprocket 480 secured to feed belt drive shaft 202. In this manner star roller 460 and star wheels 462 are driven intermittently and in synchronism with the feed belt 192.

In order to prevent any buckling or bulging upwardly of the tobacco leaves L while passing beneath star roller 460, and star wheels 462, a number of suitable equally curved spaced guide fingers 482 may be provided. These fingers preferably are located above and project downwardly between the equally spaced star wheels 462. Fingers 482 also tend to prevent any leaf particles from adhering to the rotating star wheels (Figure 21). Fingers 482 are mounted on a supporting bar 484 (Figures 4 and 21) preferably adjustably secured at each end to the inner sides of side walls 54 of the filler feed frame in such positions that free passage of the tobacco layer L beneath fingers 482 can take place at all times.

After a predetermined width of tobacco layer L is moved onto bridge plate 458, as indicated in Figure 22, further travel of belt 192 is interrupted, knife 410 descends and in cooperation with the ledger plate 452 severs strip S from tobacco layer L. At substantially the same time knife bar 410 begins to descend, bridge plate 458 starts to swing away from the edge of the ledger plate 452 to permit knife 410 to engage ledger plate 452 (Figure 23) and cut off strip S. Following completion of the strip cutting operation, the bridge plate 458 continues to swing away to its rearmost or inoperative position (Figure 24). A stripper bar 486 rests loosely upon plate 458 at all times and during the rearward or withdrawing motion of bridge plate 458 strips tobacco strip S from bridge plate 458 whereupon strip S falls into the cross feed channel U. As soon as the forward edge of bridge plate 458 becomes aligned with the beveled forward edge of stripper bar 486 a plunger plate 488 is operated to follow the falling tobacco strip S into cross feed channel U, and presses it firmly upon belt 532 in the bottom of channel U (Figure 24) after which the plunger plate 488 is retracted and returned to its inoperative position (Figure 21). A reference to Figures 4 and 24 makes it evident that each strip S cut from a layer L moves in a path of movement substantially at right angles to the path of movement of layer L as each strip S is placed in the cross feed. Also as shown in Figure 4, each strip S, as deposited upon previously placed strips S forming a stream of filler tobacco in the cross feed, assumes a shingled relationship. Due to the manner in which bridge plate 458, stripper bar 486 and plunger plate 488 coact, the arrangement of tobacco in each strip S delivered into the cross feed remains substantially unchanged.

Bridge plate 458 is supported by a pair of arms 490 (Figures 1a and 2) fixed to a shaft 492 loosely mounted in suitable bearing brackets 494 fastened to magazine frame uprights 50. Shaft 492 is rocked by lever 496 (Figures 1a and 2a) which through an adjustable connecting rod 498 is connected to cam lever 500 fulcrumed on shaft 148 provided with a cam follower 502 engaging a cam 504 mounted on sleeve 436 on shaft 128. Stripper bar 486 which rests loosely on bridge plate 458 is secured to a pair of suitably shaped arms 506 (Figures 21-24) loosely mounted on shaft 508 supported in bearing brackets 510 fastened to lugs 512 on bracket 456. Plunger plate 488 is attached to a pair of suitably shaped arms 514 which are secured to shaft 508 actuated by means of lever 516 through an adjustable connecting rod 518 connected to cam lever 520 fulcrumed on cam lever supporting shaft 148. Cam lever 520 carries a cam follower 522 which engages with a cam 524 mounted on sleeve 436 on shaft 128.

In order to provide resiliency for plunger plate 488, shaft 508 carries an arm 526 to which is attached a spring 528 anchored to a suitable stud 530 secured to the lower side of one of the projecting lugs 512 of bracket 456 (Figure 1a).

The cross feed channel U which is mounted adjacent the end of the filler feed belt 192 preferably forms a part of the cigar machine cross feed H (Figures 2a and 25) which may be of the same construction as that disclosed in application, Serial No. 522,701, filed February 17, 1944, by James P. Durning, now Patent 2,470,766, issued May 24, 1949. Cross feed channel U preferably is provided with a substantially horizontal feed belt 532, and two spaced substantially vertical feed belts 534 and 536. The three feed belts are driven intermittently through a shaft 538 which is supported in suitable bearings in cross feed supporting frame 540 secured to bed plate 112 of the cigar machine frame 542. Shaft 538 is driven intermittently by means of a ratchet 544 (Figure 25) actuated by a pair of pawls 546 pivoted on an oscillating arm 555 loosely mounted on shaft 538. Arm 555 is connected by an adjustable rod 548 to a cam lever 550 (Figure 2a) provided with a cam follower 552 engaging a cam track 554 in cam 556 mounted on the main shaft 178 of the cigar machine and supported in suitable bearings in cigar machine frame 542. Shaft 178 also carries a gear 558 which is driven continuously from the main drive of the cigar machine 178. Cam lever 550 is loosely mounted on a cam lever supporting shaft 560 supported in cigar machine frame 542. Feed belt 532 located in the bottom of the cross feed channel, is driven by a drum 562 secured to intermittently rotating shaft 538. Belt 532 preferably is led over several suitable idler pulleys, and a guide pulley 564 (Figure 2) which is supported in an adjustable bearing lug 566 secured to the end of the bracket 456.

The vertical feed belts 534 and 536 are led over guide rollers 539 and 541 (Figure 4) respectively, and are driven by means of rollers 535 and 537 (Figure 4a), respectively. Each belt is also led over a number of idler rollers to suit the construction of the cross feed channel (Figures 4 and 4a). The top edges of that portion of the vertical belts 534 and 536 which form the cross feed channel U are guided by suitable plates 543 and 545, respectively, suitably mounted over rollers 535 and 539, and 537 and 541, respectively. Rollers 535 and 537 are mounted on vertical shafts 547 and 549, each of which is driven by a bevel gear 551 (Figures 2a and 25), each of which meshes with a bevel gear 553, both of which are secured to shaft 538 which also carries the drum 562 driving the bottom belt 532 of the cross feed channel.

Referring to Figures 1, 1a, 2, 2a, 4 and 4a, it will be seen that from the time loaded trays of tobacco P are placed in magazine M until raw bunches are formed, all tobacco handling and manipulating operations are completely automatic. That is, long filler tobacco is fed from the magazine, cut to size, substantially uniform bunch charges are formed, and rolled in binders into raw bunches for further handling and completion of finished cigars in cigar making instrumentalities (not shown). In order to show the coaction between the automatic long filler feed and the mechanism which forms a vertical column of superimposed lengths of filler tobacco, sufficient mechanism is shown in Figures 2a, 4a, 25, 25a and 26 which embody mechanism similar to that shown and described in the Durning patent, referred to hereinabove.

In Figures 2a, 4a, 25, 25a, 26 and 27, there are disclosed mechanisms which are interconnected and synchronized with the tobacco layer feeding strip cutting and cross feed mechanism for feeding a continuous stream of long filler tobacco of proper width to a bunch length cutting device and forming a column consisting of superimposed bunch lengths from which substantially uniform bunch length charges are separated, associated with binders, and rolled into bunch formation.

As shown in Figures 2a, 4a, 25 and 26, a continuous stream of tobacco is made up of shingled strips S which are disposed on endless belt 532 traveling upon plates 456, 457 and advanced thereby into the range of operation of a corrugated bunch length cutter 592. As the stream of tobacco approaches the corrugated cutter 592 it passes beneath a plurality of spaced intermittently rotated star wheels 570 mounted on shaft 572 supported in brackets 574 secured to a cross feed frame member 541. Shaft 572 is driven in the direction of the arrow (Figure 2a) by means of a sprocket chain 576 running on a sprocket 578 fixed to shaft 572 and a sprocket 580 on a shaft 582 which is provided with a gear 584 meshing with an intermittently driven gear 586 on shaft 538.

As the result of each intermittent movement of belts 532, 534, 536, the continuous stream of filler tobacco is advanced into an extension of the filler feeding channel formed by two spaced plates 590 wherein a corrugated cutter 592 severs a predetermined length from the leading end of the filler tobacco stream. Each severed section should correspond to the length of cigar bunches to be formed. Since the mechanism for effecting this purpose does not form a specific part of this invention, further showing thereof is deemed unnecessary, it being sufficient to state that this mechanism is fully shown and described in the above referred to Durning patent. If desired, the length of filler stream fed per movement of the belts 532, 534 and 536 can be adjusted accurately, all as disclosed in said Durning patent.

The tobacco filler stream S, as mentioned hereinabove, is advanced intermittently between plates 590 for severance of bunch lengths. The cutting of such lengths can be effected by a vertically reciprocating corrugated cutter 592 which is mounted on a vertically movable slide 594, guided in a dove-tailed channel 596 (Figure 25) of a pedestal 598 secured to the cross feed supporting frame 541. Vertical slide 594 is actuated through a link 600 by an arm 602 loosely mounted on a stud (not shown) held by pedestal 598. Arm 602 is oscillated through an adjustable connecting rod 604 by a cam lever 606 loosely mounted on shaft 610 (Figure 2A). Cam lever 606 carries a cam follower 608 engaging a track 216 of cam 614 on cam shaft 178.

On a stud 616 on arm 602 by which connecting rod 604 is pivoted to said arm, is also pivotally mounted one end of a link 618, the other end of which link is pivoted to a stud 620 (Figures 2a and 25) to which are also pivoted links 622, 624, the latter forming a toggle which is actuated by link 618. Link 622 is pivoted to a stud 626 held by a stationary lug 628 of a bracket 630 of pedestal 598. Link 624 is pivoted to a stud 632 held by a collar 634 adjustably secured to a vertical shaft 636 slidably mounted in suitable bearing lugs of bracket 630 and pedestal 698 (Figures 2a and 25).

On the lower end of vertical shaft 636 is mounted a compressor foot 638 which extends into the filler feed channel (as shown in Figure 2a) and is provided with upturned portions or fingers 640 extending between stud wheels 570. Secured to foot 638 is a vertical guide shaft 642 projecting through a guide hub 644 of pedestal 598. These fingers function to prevent tobacco from being carried upwardly and out of the filler feed channel by the star wheels, and also assist in properly guiding the tobacco stream into the range of action of cutter 592.

The pressure foot 638 serves the purpose of compressing the tobacco filler stream in the feed channel prior to its advancement onto a bridge plate 642, and also to hold the tobacco stream firmly while being subjected to the action of the corrugated cutter 592. The compressing of the leading end of the filler stream prior to its movement onto bridge plate 642 prevents a disarrangement or telescoping during its forward travel.

As shown in detail in the above referred to Durning patent, the cutting of a bunch length section from the filler feed stream is effected by the coaction of cutter 592 with a stationary correspondingly corrugated cutter or ledger plate 644 forming a bridge between the horizontal feed belt 532 and horizontal bunch length section supporting plate 642. Ledger plate 644 is mounted on a bridge bracket 646 attached to the cross feed frame member 541.

As corrugated cutter 592 descends during the cutting operation, plate 642 is quickly withdrawn. The cutter then severs a bunch length section from the leading end of the filler stream and it drops into a stationary column forming charge measuring chamber indicated generally 650 (Figures 2a and 4a) consisting of a pair of spaced side walls 652, 654, underlying the walls 590 (Figure 26), and one end wall 656, which has a corrugated inner face and a straight end wall 658. The latter is a portion of lug 660 (Figures 2a, 4a and 25) mounted on a stationary bearing bracket 662 attached to a bracket 664 (Figure 25) secured to bed plate 112. The corrugated end wall 656 is supported on a ledge of bridge bracket 646, mentioned heretofore. The corrugated face of end wall 656 conforms to the corrugation of the ledger plate 644 and serves the purpose of maintaining alignment of the corrugated ends of the cut charge and preventing their disturbance while being deposited into measuring chamber 650, and holds said corrugated ends during the cutting operation of the horizontal filler knife.

To withdraw the charge supporting plate 642 from the position it occupies in the space between the top of the measuring chamber 650 and the side walls 590 and the space between the bottom of the stationary cutter plate 644 and end wall 656, it is actuated from an arm 666 (Figures 25, 26 and 27) which through a link 668 is connected to a lug 670 of plate 642. On a stationary guide rod 672 secured in and projecting from a suitable hub on side wall 652 of the measuring chamber 650, is slidably mounted the lug 670, thus guiding the charge supporting plate 642 in its horizontal reciprocating motion. Arm 666 is pivoted to a stud 674 held by a suitable bearing lug of pedestal 598 (Figures 2a and 25). From the hub of arm 66 projects an operating lever 676 which is connected by means of an adjustable rod 678 to a cam lever 680 (Figures 2a and 25) carrying a cam roller 682 engaging with a cam track 684 of the cam 614. Cam lever 680 is loosely mounted on the supporting shaft 560.

Underneath and exactly in line with the above mentioned measuring chamber 650 is located a horizontally movable charge transfer designated generally 690 (Figures 2a, 4a, 25, 26 and 27) consisting of two side walls 692, an end wall 694 secured to walls 692 and another end wall formed on a lug 696 to which said side walls are secured. Lug 696 projects from a sleeve 698 slidably supported by a horizontal shaft 700 held by the bearing bracket 662 mentioned heretofore. The wall 694 at the other end of the charge transfer 690 is slidably supported in a groove of the cross feed supporting member 541 and by a bottom guide rail 702 along which it slides in a channel formed by an end guide rail (not shown) and a top guide rail (not shown) and rail 702. A lug 706 on the bottom of sleeve 698 (Figures 4a and 25) is connected by a link 708 to an oscillating arm 710 loosely mounted on a shaft 712 (Figure 2a) supported by a pair of suitable bearing brackets 713 attached to the end of bed plate 542. An actuating lever 714 on the hub of arm 710 is connected by an adjustable rod 716 to a cam lever 718 carrying a cam roller 720 engaging with a ratchet 722 of a cam 724 (Figure 2a) mounted on the main cam shaft 178. Cam lever 718 is loosely mounted on the supporting shaft 610. Lug 696 of sleeve 698 may be provided with an adjustable stop screw (not shown) which engages the stationary bearing bracket 662 when the charge transfer 690 is in its rearmost position (Figure 4a) for the purpose of properly aligning said charge transfer 690 with the measuring chamber 650. In synchronism with the descending corrugated cutter 592 operates a measuring plunger 726 which trails slightly behind said descending cutter until the latter has severed a bunch length section C from the filler stream S. The cutter then dwells in the position at which it has completed the severing of the charge while the measuring plunger continues descending toward the tobacco column D, which represents an accumulation of several superimposed bunch length sections. While the corrugated cutter and measuring plunger are descending together, a measuring platform 728, which closes the bottom opening of the charge transfer 690, but is slightly smaller than said opening to have a sliding fit therein, ascends into said charge transfer and moves the tobacco column D which rests on said platform, slightly upward. The section cut from the filler stream S drops on top of said column D, and the plunger 726 continues to descend. When the measuring plunger comes in contact with said tobacco column, the measuring platform 728 being in its uppermost position and inside of the charge transfer, it continues its downward movement for a short distance to effect compressing of the tobacco column D in measuring chamber 650 and the charge transfer 690. After the measuring plunger has come to rest with the compacted column D between the latter and the measuring platform 728, a metal knife or cutting plate 730 whose cutting edge may extend diagonally thereof at any suitable angle such as 45° or greater, enters the space 732 between the bottom of the measuring chamber and the top of the charge transfer and cuts a bunch charge B from the compacted tobacco column D. A suitable thickness of knife 730 has been found to be $\frac{1}{32}$ of an inch. The height of thickness of the bunch charge is determined by the vertical distance between the measuring platform 728 and the knife 730. The spacing of the platform from the knife may be regulated to correspond with the desired thickness of the bunch charge.

The substantially flat shingled and/or superimposed leaf arrangement in layers L and stream S contribute materially in minimizing the formation of small particles and scrap during separation of bunch charges from column C. That is, because of the mechanism and method of handling and feeding tobacco employed the column of tobacco tends to approximate a stack of flat sheets through which knife 730 can pass without excessive tearing or cutting of leaves or portions thereof.

The horizontal knife 730 which cuts the charge B from the bottom of the tobacco column D, is adjustably mounted on a horizontal slide 830 supported and guided by a dove-tailed channel 832 (Figure 25) in the upper portion of bracket 664. The slide 830 is connected by an adjustable connecting rod 834 to an oscillating arm 836 loosely mounted on shaft 712 (Figure 2a). From the hub of oscillating arm 836 extends an operating lever 838 which by means of an adjustable connecting rod 840 is connected to a cam lever 842 carrying a cam roller 844 engaging with a cam track 846 of cam 724. Cam lever 842 is loosely mounted on shaft 560. In order to limit the expansion of the compacted tobacco column D in the measuring chamber 650 after the knife 730 has cut a charge B from the bottom and measuring plunger 726 has started to move upward to release the compression of column D, the knife 730 is equipped with a number of retainer fingers 848 (Figures 25 and 26) which travel with the horizontally reciprocating knife and enter measuring chamber 650 through corresponding ports 850 in one of its side walls above the top level of the tobacco column D which at that moment is compacted by the measuring plunger 726 which is provided with corresponding slots 852 to permit retainer fingers 848 to enter above the tobacco column. When plunger 726 starts to move upward and releases the column D, the latter cannot expand farther than fingers 848, thus preventing any possible interference of the tobacco column with the charge supporting plate 642 which as soon as plunger 726 passes moves in and closes the top of measuring chamber 650 ready to receive and support a bunch length.

After the charge B is cut from the tobacco column D, the measuring platform 728 again descends and stops at a position aligned with the bottom of the charge transfer 690 and the top of a stationary bridge plate 734. Plate 734 has an opening, in which the platform 728 has a sliding fit (Figures 26 and 27) for movement upwardly into the measuring chamber. The charge B is then moved by transfer 690 in the direction of the arrow in Figure 27, across another plate 735 (Figure 26), and onto the rolling apron 736 of the bunch rolling mechanism of the cigar machine. It may be noted that the diagonal arrangement of the cutting edge of the knife 730 is such that in severing the bunch charge the knife moves forwardly to a position overlying the path of the charge transfer 690 to the rolling apron so that the foremost corner of its cutting edge will rest on the rear side of the charge transfer when in foremost position and thereby prevent flexing of the knife which might interfere with the return movement of the charge transfer.

Charge B is ejected from the charge transfer 690 by vertically reciprocable ejector 738 (Figures 4a and 26) which presses the charge against the portion of the apron overlying platform 740 while the latter is lowered together with apron 736, to a position where the charge is substantially aligned with the rolling table 742 of the bunch rolling mechanism of the machine.

A loop or pocket former 744 which is connected to and descends with the ejector 738 is employed for the purpose of stretching the apron smoothly over the platform 740 and forming a loop at one side thereof. The ejector 738 and loop former 744 then ascend, rolling pin 746 advances in the direction of the arrow shown in Figure 26, and rolls the charge B upon itself and within a binder to form a cigar bunch. As soon as plunger 738 and loop former 744 have returned to their uppermost position, the charge transfer 690 returns to its original position, aligned again with the stationary measuring chamber 650. Thereupon the horizontal knife 730 withdraws to a position wherein its foremost corner is between the rear walls of the measuring chamber and charge transfer, and the remaining portion of the tobacco column in measuring chamber 650 drops into the charge transfer now positioned below the chamber. While the charge transfer 690 is moving its charge B onto the rolling apron 736, the charge supporting plate 642 moves in again, covering the measuring chamber 650 and ready to support the advancing end of the tobacco filler stream from which a new bunch length is to be cut and be deposited on the top of the tobacco column D in the measuring chamber 650, after withdrawal of plate 642.

The stationary side walls 590 of the filler feed channel extension are provided at either end with suitable flanges. The flanges at one end thereof are attached to the cross feed supporting member 541 while the flanges at the other end are secured to a supporting bar 745 fastened to the lug 660 of the measuring chamber 650. The free end of the compressor foot 638 is cut out to provide corrugations 748 (Figure 2a) which conform to the shape of cutter 592. Thus the filler stream S is compressed and held down adjacent the cutting edge of the cutter 592 and the corrugations 748 also act as a scraper for any particles of tobacco which might cling to the cutter 592 while it is ascending. One end of the measuring plunger 726 is provided with corrugations 750 (Figure 25) which fit the corrugations of cutter 592 and fit into the corrugations of end wall 656 of the measuring chamber 650, whereby not only the center portion of the tobacco column D but one of its corrugated ends as well are compacted by the measuring plunger.

The measuring plunger 726 is attached to the lower end of a vertical shaft 752 (Figures 2a and 25) slidably supported by means of a pair of suitable bearing brackets 754 and 756, both of which are rigidly attached to the pedestal 598. Shaft 752 is reciprocated by an oscillating forked lever 758 carrying a pair of rollers 760 engaging with a collar 762 loosely mounted on shaft 752. To the latter is adjustably clamped a lug 764 against which the collar 762 is held by a compression spring 766 seated against a collar 768 fastened to shaft 752. In order to prevent turning of the measuring plunger 726, it is provided with a vertical guide rod 770 projecting from said plunger and engaging with a guide sleeve 772 held by a suitable lug extending from bracket 754. The lever 758 is fastened on a horizontal shaft 774 (Figure 25), supported by suitable bearings in pedestal 598. Shaft 774 carries a rocker arm 776 which is connected by an adjustable rod 778 to a cam lever 780 (Figure 2a), having the shape of a bell crank and carrying a cam roller 782 engaging with a cam track 784 of the cam 556 on cam shaft 178. Cam lever 780 is loosely mounted on the supporting shaft 560. The downward movement of the measuring plunger 726 is effected by the downward motion of the oscillating arm 758 which, by means of rollers 760 depresses the collar 762 and through spring 766 and collar 768, imparts downward motion to shaft 752. The tobacco column D in the measuring chamber 650 offers resistance to the descending measuring plunger, but arm 758 continues its downward stroke for a short distance, thereby compressing spring 766 and causing collar 762 to move away from lug 764. In this manner sufficient pressure is exerted through compression spring 766 and collar 768 to effect compaction of the tobacco column D in the measuring chamber 650 and charge transfer 690.

In order to effectively control the height of the tobacco column D in the measuring chamber 650, which normally consists of several charges, the lug 764 mounted on shaft 752 carries an adjustable trip screw 786 which normally, during the downward movement of shaft 752 and plunger 726, engages the free end 788 of a double lever 790 pivoted to a stud 792 held by pedestal 598. The other end 794 of double lever 790 is connected with the feed belt control link 796. Therefore, when trip screw 786 contacts end 788 of lever 790 and presses the same downward, the other end 794 of lever 790 moves upward and through link 796 causes an upward motion of control arm 798 and lock arm 800. The upward movement of the latter permits the stop screw 801 to move in the path of lug 802 and effect a release of the lifted pawls 546, the feed belt drive control is tripped and a new charge is fed in the following cycle of the machine. It will be noted that the control arm 798 and lock arm 800 are moved downwardly by spring 803 when the trip screw 786 moves away from the lever 790, to permit arm 800 to reengage lock plate 804 (see Figure 25a), when the latter is returned to its initial position by engagement of resetting screw 805 with arm 806. Resetting screw 805 is mounted on the free end of an arm 807 travelling with and projecting from the hub of oscillating arm 555. In case the tobacco column D in the measuring chamber 650 is too high, that is, too much tobacco has accumulated in chamber 650, the measuring plunger cannot enter very far into the chamber and plunger 726 and shaft 752 come to rest before trip screw 786 can contact end 788 of double lever 790, thus no tripping can take place and control arm 798 and lock arm 800 remain in their position and no release of pawls 546 is effected. Thus pawls 546 remain lifted through the following cycle. Therefore, the feeding action of the feed belts 532, 534 and 536 is interrupted and no charge is fed during the following cycle of the machine.

Since the cross feed channel U works in timed relationship with and is supplied with tobacco by the automatic filler feed, described heretofore, the latter must also be operated in timed relationship with the operation of the feed belts 532, 534 and 536 of the cross feed channel U. This task is achieved by means of a switch 810 (Figures 25 and 25a) which is secured to bed plate 112 beneath a projection 812 of arm 806. Switch 810 by means of wires 814 is connected to the clutch control solenoid 188 actuating the main clutch R of the automatic filler feed. As mentioned heretofore the arm 182 carrying the wedge shaped lug 180 remains in its lowermost position, i. e., the latter projecting into the path of the sliding key 166 carried by male portion 164 of clutch R, thus disengaging the clutch as soon as sliding key 166 contacts lug 180 on arm 182, thereby effecting an arrest of the entire automatic filler feed. The control of the clutch solenoid 188 by means of switch 810 is as follows. When measuring plunger 726 enters the measuring chamber 650 and the tobacco level in said chamber is normal, plunger 726 descends low enough to effect a contact of trip screw 786 with double lever 790 causing a disengagement of lock plate 804, as described heretofore. The latter as well as arm 806 is part of a control member 816 loosely mounted on a stud 818 held by frame member 546. Arm 806 is provided with a tension spring 820 the action of which, after the disengagement of lock arm 800 from lock plate 804, causes arm 806 and its projection 812 to swing in the direction of the arrow in Figure 25a, causing projection 812 to depress button 822 of switch 810 allowing electric current to flow through the switch to the clutch solenoid 188 and energize the same. The energization of solenoid 188 in turn effects a raising of the arm 182 and its wedge-shaped lug 180 and clutch R remains in engagement for the next cycle. If, due to a high level of the tobacco in the measuring chamber 650 the measuring plunger 726 does not descend low enough to cause a contact of trip screw 786 with double lever 790, then no tripping effect takes place and button 822 of switch 810 is not depressed and therefore solenoid 188 is not energized and lug 180 on arm 182 remains in the path of the sliding key 166 of clutch R causing, upon engagement of lug 180 with key 166, a disengagement of clutch R and thus effects an arrest of the entire automatic filler feed. A stop pin 824 (Figure 25a) is provided to check the movement of projection 812 on arm 806 after depressing button 822 of switch 810.

The mechanism for actuating the measuring platform 728 and regulating its position to control the amount of tobacco in the bunch charge B cut by the horizontal knife 730 from the bottom of the tobacco column may be the same as disclosed in the heretofore mentioned Durning patent. Platform 728 is mounted on a vertical shaft 808 slidably supported by a suitable bearing bracket 809 attached to bracket 664. Shaft 808 is actuated by means of a cam 811 (Figure 2a), the track 813 engages with a cam roller and cam lever (not shown). This cam lever is connected by means of an adjustable rod 815 with a gear segment 817 engaging with a gear 819 of an eccentric shaft 821 carrying a suitable lug 823 to which is pivoted another lug (not shown) which engages with the bottom portion of vertical shaft 808. Eccentric shaft 821 as well as the gear segment supporting shaft (not shown) are supported by suitable bearings of a bracket 825 secured to the lower side of bed plate 112.

Plate 735 (Figures 4a and 26) over which the charge B in transfer 690 is moved onto the rolling apron 736 is mounted on a pair of lugs 860 which are secured to an oscillating horizontal shaft 862 supported in bearings of the vertical arms of a reciprocating U-shaped bracket 864, the lower portion of which is secured to a slide 866 (Figure 26), slidably supported in dove-tailed channels 868 of a suction table bed frame 870 suitably mounted on a supporting member 872. Slide 866 is provided with a lug 874 which through an adjustable connecting rod 876 is connected to the free end of an oscillating cam lever 878 actuated by a suitable cam (not shown) of the cigar machine. To horizontal shaft 862 furthermore is loosely mounted the rolling pin 746 mentioned heretofore. To one end of said shaft 862 is also secured the female portion 880 (Figures 4a and 28) of a sliding coupling which engages with a male member 882 of the coupling which is mounted on a shaft 884 supported by a suitable bearing of a stand 886. To shaft 884 is secured a gear 888 which engages with a vertical gear rack 890 slidably supported in a suitable channel of stand 886. The lower end of rack 890 is provided with an extension 892 which through a link 894 is connected to a suitable cam lever (not shown) which is actuated by a suitable cam (not shown) of the cigar machine. The female portion 880 of the sliding coupling is provided with a lug 896 carrying a roller 898. Female portion 880 traveling with the reciprocating rolling pin bracket 864 can be engaged and disengaged from the stationary male member 882 only when the rider plate 735 is in a horizontal position.

As mentioned heretofore, the cut charge B is moved by the charge transfer 690 over rider plate 735 onto the rolling apron 736, rider plate 735 then serving as a bridge between plate 734 and apron 736. In the meantime the platform 740 has moved upward and contacts the bottom side of said rolling apron. The ejector plunger 738 then descends and after contacting the top surface of the charge B in the transfer, the platform 740 descends also, carrying the charge B between plunger 738 and the rolling apron 736 overlying platform 740. Plunger 738 and platform 740 descend to a position where the top surface of the charge B is substantially aligned with the rolling table 742, after which said plunger 738 ascends again. The charge transfer 690 being more or less a frame, remains at the same level upon its arrival over the platform, but as soon as plunger 738 has reached its uppermost position again, transfer 690 returns to its original position beneath the measuring chamber 650, ready to take a new charge. Ejecting plunger 738 is secured to an arm 896 which is mounted on a vertically reciprocating shaft 898 slidably supported by suitable bearings in stand 886. To arm 896 is also fastened a loop former 744, traveling with plunger 738 and employed for the purpose of keeping the apron 736 smooth over platform 740 during the descending movement of the latter and also to form a loop in the apron between the rear edge of said platform and the rolling pin 746. Vertical shaft 898 through a link 900 (Figure 26) is actuated by means of a suitable cam (not shown) of the cigar machine. Apron 736 at one end is clamped to the forward end of the rolling table 742 while the other end is secured to an apron roller 902 well known in the art. The rolling table 742 to which suction is supplied is also of the usual construction, provided with holes or channels 743 which permit suction to reach the perforated section of the apron 736 upon which a binder W is placed by the operator.

As soon as the charge transfer 690 has returned to its original position beneath the measuring chamber 650, the rider plate is turned 180° by means of the vertically reciprocating gear rack 890 acting upon gear 888 on shaft 862, thus laying said rider plate flat over the charge on the apron above the platform 740. The bracket 864 due to the action of cam lever 878 then moves forward, thus effecting also a forward movement of rolling pin 746 and rider plate 735, and the flat charge B is rolled up from its rear edge somewhat as a carpet is rolled up, and moving over the surface of the rolling table where a binder has been placed on the apron by the operator. The binder is wound about said charge and forms a cigar bunch N which at the forward end of said rolling table is deposited in a suitable bunch transfer 910 which transfers the bunch to a wrapping device (not shown) of the cigar machine. Since the rider plate 735 after being turned 180° and brought in contact with the top surface of the charge is in a substantially horizontal position, the following forward movement of bracket 864 effects a disengagement of the female member 880 on shaft 862 from the male member 882 on the stationary shaft 884. The rider plate now advances with the shaft 862 and the rolling pin 746, lug 896 carrying roller 898 projecting upward until the latter contacts a stationary cam plate 912 which during the continued forward movement of bracket 864 causes the rider plate to turn back 180°. By that time the thin charge B has been rolled into a bunch by the action of rider plate 735 and apron 736, and although rider plate 735 is now in upside down position it follows the rolling pin to the end of its stroke. When rolling pin 746 returns to its original position, carrying the rider plate in horizontal upside down position, back to its starting point, it effects on its way a reengagement of female member 880 with male member 882 of the sliding clutch before again bridging the gap between plate 734 and rolling apron 736. A safety guide rail 912 secured to stand 886 is provided to assure the return of rider plate 735 in a horizontal position essential for a reengagement of the sliding coupling. Cam plate 912 is secured to a bracket 916 attached to an arm 918 of stand 886.

A brief description of the operation of the machine is as follows: Loaded trays P of tobacco T are stacked and maintained in substantially horizontal spaced relationship in magazine M with the opposite edges of each loaded tray resting on supporting bars 32 attached to endless chain conveyors 34 mounted for operation at each side of magazine M. As described in detail hereinabove, the operation of tray conveyors 34 and the driving means therefor, and the tray ejecting and stripping mechanisms are so timed that as soon as one tobacco layer L on belt 192 is exhausted, a new layer L is deposited thereon, and the empty tray P discharged from the machine. The deposit of a tobacco layer L on conveyor belt 192 results from the engagement of the rear edge of a tray P by pusher lugs 314 which move it into a substantially horizontal plane out of magazine M. As the tray P is moved from magazine M, stripper fingers 368 engage the edge of the tobacco layer L opposite the edge of the tray engaged by pusher lugs 314 and strip the tobacco layer L therefrom. The manner in which a layer L of tobacco is deposited on belt 192 is clearly shown in Figures 16, 17 and 18.

As the result of the intermittent movement of conveyor belt 192 (in the direction of the arrows shown at the top of Figure 4), a predetermined length of a tobacco layer L resting thereon is delivered over a bridge plate 458 which, at the time of movement of conveyor belt 192, occupies the position shown in Figure 22. When the advancing end of layer L has been positioned on bridge plate 458 resting against stripper bar 486, as shown in Figure 22, knife 410 is actuated to cut off a strip S, as shown in Figure 23. Plunger plate 488 is then moved downwardly, to follow tobacco strip S as bridge plate 458 is retracted, and presses strip S firmly upon belt 532 in the bottom of channel U, as shown in Fig. 24, after which plunger plate 488 is retracted and bridge plate 458 returns to its inoperative position.

As the result of the operation of knife 410 and the disposition of strip S on endless conveyor belt 532 which travels, this and other strips previously placed on conveyor belt 532 endwise to the cigar machine designated generally H, there is formed a continuous stream of overlapped strips of tobacco S, as shown in Figures 4 and 4a.

Conveyor belt 532 which supports the stream of shingled tobacco strips S is driven intermittently to advance the stream of tobacco strip S to a cigar machine designated generally H in order that bunch length tobacco may be cut from the leading end thereof and be deposited in stationary column forming charge measuring chamber designated generally 650 (Figures 2a and 4a). The cutting of bunch length sections from filler feed stream S is effected by a vertically reciprocating corrugated cutter 592 which coacts with a stationary complementary cutter ledger plate 644 all as described hereinabove.

As shown in Figures 26 and 27, horizontal knife 730 is actuated to cut bunch charges B from the bottom of tobacco column D in chamber 650. Each bunch charge thus formed is moved by transfer 690 across plate 735 and deposited upon rolling apron 736 of the bunch forming mechanism of the cigar machine, where it is associated with a binder (not shown) rolled by apron 736 into a cigar bunch (not shown).

As described in detail hereinabove, the need for additional tobacco in column forming charge measuring chamber 650 is communicated by control mechanisms which operate the drive shafts of conveyor belts 532 and 192 and also by means which actuates conveyors 34 and pusher lugs 314 whenever a tobacco layer L on conveyor belt 192 is exhausted. The driving relationship between conveyor belts 192 and 532 is such that conveyor belt 192 moves once for each three step by step movements of belt 532. In this manner, the desired shingled relationship of tobacco strip S is maintained on conveyor belt 532. At all times the machine operates automatically to effect the feed of tobacco from magazine M to cigar machine H.

The invention above described may be varied in construction within the scope of the claims, for the particular device, selected to illustrate the invention, is but one of many possible concrete embodiments of the same. It is not, therefore, to be restricted to the precise details of the structure shown and described.

What I claim is:

1. In a cigar machine, the combination with mechanism for forming a stream of cigar filler tobacco, of a traveling conveyor constructed and arranged to support said stream and intermittently advance the leading end thereof to a cutting station, a magazine containing a plurality of preformed layers of tobacco substantially quadrilateral in form in plan and with the major axis of each piece of tobacco extending generally at right angles to the major axes of said layers, a layer support, a conveyor in said magazine for delivering layers of tobacco in succession from said magazine to said support, means operative after a layer has been placed on said support for feeding said layer edgewise, a strip cutter for cutting strips from the advancing end of said layer above said conveyor, means for intermittently depositing said strips of filler tobacco on said conveyor to form said stream thereon, a bunch length cutter located at said station for separating bunch lengths from said advancing end of said stream, and, mechanism for forming a superimposed column of bunch lengths.

2. In a cigar machine, means for supporting a layer of prearranged long filler tobacco substantially uniform in area with the major axis of each piece of tobacco extending generally at right angles to the major axis of said layer, means for feeding said layer edgewise, means for cutting strips of predetermined width from the advancing end of said layer, bunch forming mechanism, a conveyor positioned closely adjacent to said cutting means to receive said strips as cut from said layer, means, including a stripper bar and a presser plate, for moving said strips downwardly onto said conveyor and maintaining the arrangement of the tobacco in each strip substantially unchanged, mechanism for forming a substantially continuous stream from said strips of tobacco on said conveyor, means for cutting bunch lengths of tobacco from said stream, said bunch forming mechanism including, means for associating said bunch lengths in superimposed relationship to form a column of tobacco, and mechanism for controlling the quantity of tobacco in said column.

3. In a cigar machine, means for supporting a preformed layer of prearranged long filler tobacco of substantially quadrilateral form in plan with the major axis of each piece of tobacco extending generally at right angles to the major axis of said layer, means for feeding said layer edgewise, a bridge plate, means for cutting strips of predetermined length from the advancing end of said layer, bunch forming mechanism, a conveyor positioned to receive said strips as cut from said layer, means pivoted above the bridge plate and moving said bridge plate from beneath said cut strip, and a device for moving said strips downwardly onto said conveyor, said last-named means and device coacting to maintain the arrangement of the tobacco in each strip substantially unchanged, means for forming a substantially continuous stream from said strips of tobacco on said conveyor, a cutter for cutting bunch lengths of tobacco from said stream, said bunch forming mechanism including, means for associating said bunch lengths to form a column of tobacco, and mechanism for controlling the quantity of tobacco in said column, said last-named mechanism including means for advancing said conveyor intermittently to deliver said stream to said bunch length cutter whenever the quantity of tobacco in said column falls below a predetermined minimum, and separate control means for controlling the advance of said layer to said strip cutting means.

4. In a cigar machine, the combination with a magazine, a plurality of magazine trays containing layers of tobacco of substantially quadrilateral form in plan, devices for supporting said trays in vertical stacked relationship and feeding said trays in succession from said magazine, a conveyor located adjacent said magazine, driving means for said conveyor, a stripper device for discharging a layer of tobacco from a tray onto said conveyor, means for operating said driving means intermittently to feed a layer of tobacco on said conveyor to a strip cutting station, a second conveyor located adjacent said station, a strip cutter at said station for cutting strips of predetermined width from said advancing layer, means for depositing each strip as cut on said second conveyor, means for driving said second conveyor to advance said stream, and means operative in response to the exhaustion of a layer of tobacco on said first-named conveyor for actuating said devices, and a stripper device to deliver a new layer of tobacco to said first-named conveyor.

5. In a cigar machine, a magazine, a plurality of stacked trays supporting layers of filler tobacco substantially uniform in area located in said magazine, spaced traveling tray supports in said magazine, driving means for operating said supports to discharge loaded trays in succession therefrom, a layer receiving and feeding conveyor, a strip cutting station, cutter devices at said station, means for intermittently driving said layer receiving and feeding conveyor to advance a layer supported thereon to said cutter devices at said station, means for operating said devices to cut strips of predetermined width from said layer, and control mechanism for said driving means for said supports operative when all of a layer on said receiving and feeding conveyor has been cut into strips for effecting the delivery of a new layer onto said conveyor.

6. In a cigar machine, the combination with a cigar bunch forming mechanism, and means for accumulating a predetermined quantity of bunch lengths of tobacco in said mechanism, of a magazine containing a plurality of substantially vertically spaced stacked preformed layers of prearranged tobacco, a conveyor delivering a stream of filler tobacco to said mechanism and means for cutting bunch lengths therefrom for addition to said accumulated tobacco, means for feeding layers in succession from said stack, a stripper coacting with said last-named means for maintaining the arrangement of said tobacco in said layers substantially unchanged, means for cutting strips from said layers for delivery to and deposit onto said conveyor, driving mechanism for driving said conveyor and said layer feeding means in predetermined timed relationship, and control means for operating said driving mechanism whenever said quantity of accumulated tobacco reaches a predetermined minimum.

7. In a cigar machine, a magazine, a plurality of spaced stacked trays in said magazine, each of said trays having a substantially flat, uniplanar tobacco supporting surface loaded with prearranged layers of filler tobacco substantially uniform in area, a tray delivery station, mechanism for delivering trays in succession to said station, a layer supporting surface positioned to receive layers of tobacco carried by said trays, means for operating said mechanism to deliver a tray to said station, and a device operative at said station for effecting the removal of said layer of tobacco from said tray and, said device including stripper means for effecting the deposit of said layer on said surface with the arrangement of the tobacco in said layer substantially unchanged.

8. In a cigar machine, a magazine, a plurality of vertically spaced trays in said magazine, each of said trays supporting a wide substantially oblong shaped preformed layer of prearranged tobacco leaves and pieces with the major axes of said leaves and pieces extending in a direction substantially at right angles to the major axis of said layer, means for removing layers in succession from said trays, mechanism for advancing said preformed wide layer of cigar filler tobacco edgewise in the direction of its major axis, a cross feed constructed and arranged to receive tobacco delivered from said magazine by said mechanism, means for cutting strip lengths of predetermined width from the advancing end of said wide prearranged tobacco layer for deposit in said cross feed, a cigar bunch forming machine, and control mechanism in said machine for controlling the operations of said first-named mechanism and said cross feed.

9. In a cigar machine, a cigar filler magazine, supports in said magazine, a plurality of substantially horizontal filler loaded trays carried by said supports, means for moving said supports to discharge trays in succession from said supports, a conveyor located in said magazine, and means for effecting relative substantially straight line movement between a tray and a layer of tobacco on said tray for delivering said layer of tobacco from a tray discharged from said supports onto said conveyor, said last-named means including a stripper, supports mounting said stripper above the path of movement of said tray, said supports positioning said stripper to engage an edge of said layer of tobacco and strip said layer from said tray retaining the tobacco in said layer substantially unchanged in disposition and arrangement.

10. In a cigar machine, a magazine adapted to contain a supply of long filler cigar tobacco comprising, a plurality of substantially flat uniplanar trays loaded with layers of prearranged filler tobacco substantially uniform in area, and mechanism for supporting said loaded trays, a tray delivery station, means for delivering trays in succession to said station, a conveyor positioned to receive layers of tobacco carried by said trays, control means for operating said mechanism to deliver a tray to said station, means operative at said station for effecting the removal of said layer of tobacco from said tray and the deposit of said layer on said conveyor, said last-named means including a pusher arranged to engage an edge of said tray at said station, means for operating said pusher to push said tray with substantially straight-line movement out of said station, and stripping means positioned to engage an edge of said layer of tobacco on said tray and strip said layer therefrom during the movement of said tray by said pusher out of said magazine for delivery onto said conveyor with the prearranged condition of said tobacco substantially undisturbed.

11. In a cigar machine, a magazine adapted to contain a supply of long filler cigar tobacco, including a plurality of trays vertically superimposed loaded with layers of long filler tobacco, conveyors supporting said loaded trays, driving means for intermittently driving said conveyors, a layer supporting and feeding conveyor located beneath said magazine, means for delivering layers of long filler tobacco from said trays in succession to said layer conveyor, said last-named means including a stripper constructed and arranged to strip each layer of tobacco in substantially intact layer formation and thereby maintain each of said layers of tobacco in substantially unchanged condition when delivered on said layer conveyor, means for driving said layer conveyor to advance a layer of tobacco supported thereon, means for cutting a strip of predetermined width from the advancing end of said layer, a cross feed conveyor adapted to receive strips cut from said layer, means for driving said cross feed conveyor intermittently, means for synchronizing the operation of all of said driving means, and control mechanism for controlling the operation of all of said driving means to effect a controlled delivery of tobacco by each of said conveyors.

12. In a cigar machine, a magazine adapted to contain a supply of long filler cigar tobacco comprising a plurality of trays, each of said trays being loaded with a layer of filler tobacco of substantially quadrilateral form in plan, mechanism for supporting said loaded trays in stacked relationship in said magazine, tray supporting guides located beneath said magazine, means for delivering loaded trays in succession to said guides, empty tray receiving guides, a layer supporting surface, means for operating said mechanism to deliver a tray to said tray supporting guides, and means for moving a tray along said tray supporting guides into said tray receiving guides and delivering the layer of tobacco supported thereon onto said surface, said last-named means comprising a pusher and a stripper coacting therewith to maintain the tobacco and arrangement of said layer substantially undisturbed.

13. In a cigar machine, a magazine adapted to contain a supply of long filler cigar tobacco comprising a plurality of trays, each of said trays being loaded with a layer of filler tobacco of substantially quadrilateral form in plan, mechanism for supporting said loaded trays in stacked relationship in said magazine, tray supporting guides located beneath said magazine, means for delivering loaded trays in succession to said guides, empty tray receiving devices, a layer supporting surface, means for delivering an empty tray to said devices, and a layer stripper coacting with said last-named means for directing said layer of tobacco with the tobacco arrangement and layer formation substantially unchanged onto said surface.

14. In a cigar machine, a magazine adapted to contain a supply of long filler cigar tobacco comprising, a plurality of trays loaded with layers of filler tobacco substantially uniform in area, mechanism for supporting said loaded trays in vertically spaced relationship in said magazine, a tray delivery station, mechanism for delivering trays in succession to said station, a layer supporting surface positioned to receive layers of tobacco carried by said trays, means for operating said tray delivery mechanism, means including a plate operative at said station for stripping said layer of tobacco in substantially intact layer form from said tray and depositing said layer on said surface, said stripping means being constructed and arranged to prevent substantial disarrangement of said layer when delivered onto said surface, tray guides positioned without said magazine to receive an empty tray discharged from said station, an empty tray receptacle, and means for directing empty trays from said guides into said receptacle.

15. In a cigar machine, a magazine adapted to contain a supply of long filler cigar tobacco comprising, a plurality of trays loaded with layers of filler tobacco substantially uniform in area, mechanism for supporting said loaded trays in said magazine, a tray delivery station, mechanism for delivering trays in succession to said station, a layer supporting surface positioned to receive layers of tobacco carried by said trays, means for operating said tray delivering mechanism, tray guides positioned to receive empty trays discharged from said machine, movable extensions forming a part of said guides, means for moving said extensions into tray receiving and guiding alignment with said tray guides, means operative at said station for effecting the removal of said layer of tobacco from said tray and the deposit of said layer on said surface, said last-named means including a tray layer stripper located above a loaded tray at said station, and means for moving said stripper into operative position in engagement with a layer on a loaded tray prior to the operation of said means which effects the removal of said layer from said tray.

16. In a cigar machine, a magazine adapted to contain a supply of long filler cigar tobacco comprising a plurality of flexible trays loaded with layers of filler tobacco of substantially uniform area and consisting of long filler leaves and portions thereof arranged in substantially flat spread-out relationship, mechanism in said magazine for supporting said loaded trays in stacked relationship, a tray delivery station positioned beneath said magazine, means for operating said mechanism to deliver loaded trays in succession to said station, a layer conveyor adjacent said station, a layer remover for removing a layer from each of said trays delivered to said station and depositing said layer on said conveyor, said remover including a device for preventing lateral displacement of said layer during the operation of said remover, constructed and arranged to maintain the arrangement of said tobacco substantially unchanged, mechanism for separating said layers into strips substantially equal in width, a second conveyor on which said strips are placed to form a substantially continuous stream of flat lying strips, a cutter for cutting bunch lengths from said stream, mechanism for forming said lengths into a column, a control device, and mechanism operated by said control device for imparting movement to said first-named and said second conveyors when the tobacco in said column reaches a predetermined minimum.

17. In a cigar machine, a magazine adapted to contain a supply of cigar filler tobacco, said magazine including spaced endless conveyors, tobacco layer supporting trays, tray supporting bars mounted equidistantly along said conveyors, said bars being constructed and arranged to operate in sets, each set supporting a tray loaded with a layer of prearranged filler tobacco of substantially quadrilateral form in plan, a tray delivery station beneath said magazine, including spaced tray support guides, means for operating said conveyors to deliver the lowermost of said stacked trays onto said guides, a layer receiving surface adjacent said guides, a pusher arranged to engage an edge of a tray positioned on said guides, means for operating said pusher to move said tray along said guides and out of said magazine, and a tray layer stripper adapted to engage an edge of a layer of tobacco on said last-named tray to prevent forward movement of said layer of tobacco with said tray, said stripper thereby coacting with said pusher for stripping said layer from said tray for delivery in substantially undisturbed layer formation onto said surface.

18. In a cigar machine filler feed, a magazine adapted to contain a supply of long filler cigar tobacco comprising a plurality of flexible trays loaded with layers of long filler tobacco of substantially quadrilateral form in plan, each of said trays being provided with flat spring metal straps, mechanism for supporting said loaded trays, a tray delivery station located beneath said magazine, including spaced tray support guides, means for operating said mechanism to effect the delivery of the lowermost loaded tray of said stack to said guides, a layer receiving surface adjacent said guides, curved empty tray receiving guides mounted exteriorly of said magazine, means for pushing said tray along said guides and out of said magazine to effect the delivery of said layer in substantially undisturbed condition onto said surface, and delivery of said empty tray into said tray receiving guides, and means on said tray support guides coacting with said straps on said tray for directing the rear end of said tray downwardly for discharge from said tray receiving guides out of said machine.

19. In a cigar machine, a cigar filler tobacco magazine, a plurality of substantially horizontal loaded filler tobacco trays, supports in said magazine for said loaded trays, means for moving said supports to discharge trays in succession from said supports, a conveyor located beneath said magazine, means for removing a layer of tobacco from each tray discharged from said supports onto said conveyor, said last-named means, comprising a tray displacing conveyor and a device engaging the layer of tobacco on a tray, constructed and arranged to prevent substantial disarrangement of said layer as said tray is discharged from said supports and said tobacco is delivered to said conveyor, a strip cutting station, means for driving said conveyor to advance a predetermined amount of said layer of tobacco carried thereby to said station, and a cutter at said station for severing a strip of predetermined width from the advancing end of said layer.

20. In a cigar machine, a magazine adapted to contain a plurality of stacked layers of prearranged cigar filler tobacco substantially uniform in area, a layer receiving surface beneath said magazine, means for delivering layers in succession to said surface including a layer engaging device adapted to engage and hold said layer against disarrangement and thereby maintain the prearranged condition of the tobacco forming each of said layers substantially unchanged, means for intermittently moving a layer on said surface edgewise to a cutting station, a cutter at said station, means for operating said cutter for cutting a strip of predetermined width equal in length to a plurality of bunch lengths from the advancing end of said layer, a conveyor located substantially at right angles to said direction of movement of said layer on said surface, means for depositing each cut strip on said conveyor and forming a substantially continuous stream of filler tobacco thereon, a cigar bunch forming mechanism, a bunch length cutting device in said cigar bunch forming mechanism, means for operating said device for cutting bunch lengths from said stream, interconnected driving mechanism for effecting the delivery of tobacco to said conveyor and the advance of said stream to said cigar bunch forming mechanism, said mechanism including a control in said forming mechanism for operating said mechanism whenever tobacco is needed in said forming mechanism.

21. In a cigar machine, a conveyor for supporting a preformed layer of prearranged long filler tobacco of substantially quadrilateral form in plan for delivery to a cutting station, said layer being of a width sufficient to form a plurality of strips substantially equal in width, a cutter at said station, means for operating said cutter to cut a strip of predetermined width from the advancing end of said layer, a second conveyor located adjacent said station, mechanism for depositing each strip as cut upon said second conveyor to form a substantially continuous stream of long filler tobacco, said mechanism including a supporting device for holding each cut strip above said second conveyor, means for moving said device out of supporting engagement with each cut strip, and a member for moving each unsupported strip downwardly onto said surface in substantially intact original strip formation, means for cutting single bunch lengths from said stream of tobacco, mechanism for forming said bunch lengths into a column, and means for operating said second conveyor when the quantity of tobacco in said column is below a predetermined minimum.

22. In a cigar machine, a cigar filler magazine including, a plurality of unconnected substantially horizontal filler loaded trays, movable supports in said magazine for said trays, means for moving said supports to discharge trays in succession from said supports, a conveyor associated with said magazine, and means for removing a layer of tobacco from a tray discharged from said supports and depositing said layer upon said conveyor, said last-named means including a layer stripper mounted above said conveyor for stripping said layer in substantially undisturbed condition from said tray for delivery onto said conveyor.

23. In a cigar machine, a magazine adapted to contain a supply of filler tobacco, comprising a plurality of trays, each tray supporting a prearranged layer of filler tobacco, spaced endless vertically positioned conveyors, tray supporting bars mounted at equally spaced intervals along said conveyors, said bars being constructed and arranged to operate as sets and support filler loaded trays having substantially flat uniplanar tobacco supporting surfaces in spaced columnar arrangement in said magazine, a layer supporting and feeding conveyor located adjacent said magazine, means for intermittently driving said first-named conveyors to lower and discharge trays in succession from said support bars, a support in said magazine positioned to receive each tray as discharged from said bars, means for pushing a tray holding a layer of tobacco along said support and out of said magazine, and a layer stripper coacting with said pushers operative to strip said layer of filler tobacco from said moving tray in substantially intact original layer formation for deposit flatwise on said layer supporting and feeding conveyor.

24. In a cigar machine, a magazine adapted to contain a supply of filler tobacco, comprising a plurality of trays, each tray supporting a prearranged layer of filler tobacco, spaced endless vertically positioned conveyors, tray supporting bars mounted at equally spaced intervals along said conveyors, said bars being constructed and arranged to operate as sets and support filler loaded trays in spaced columnar arrangement in said magazine, a layer supporting and feeding conveyor located adjacent said magazine, means for intermittently driving said first-named conveyors to lower and discharge trays in succession from said support bars, a support in said magazine positioned to receive each tray as discharged from said bars, means for pushing a tray along said support and out of said magazine, a layer stripper coacting with said pushing means and operative to strip a layer of filler tobacco from said moving tray for deposit in substantially intact original layer formation on said layer supporting and feeding conveyor, a strip cutting station, means for driving said layer supporting and feeding conveyor intermittently to advance said layer to said station, a cross feed located adjacent said station, means for cutting strips from the advancing end of said layer for delivery to said cross feed, driving means for said cross feed, and means for controlling the timed operation of said conveyors and cross feed.

25. In a cigar machine filler feed, a tobacco magazine, a plurality of superimposed trays loaded with layers of cigar filler tobacco substantially uniform in area in said magazine, mechanism mounted in said magazine for supporting said loaded trays, a tray stripping station in said magazine, a tobacco layer engaging stripper at said station operative to engage and hold each layer of tobacco on a loaded tray against substantial lateral displacement, means for operating said mechanism to deliver a loaded tray to said station, and means at said station for moving said tray in a substantially straight-line path of movement from beneath said layer of tobacco held by said stripper, said stripper and said last-named means coacting to effect the removal of said layer of filler tobacco from said tray free from substantial disturbance in the arrangement of tobacco constituting said layers.

26. A cigar machine filler feed comprising a magazine, sets of spaced substantially flat uniplanar trays, conveyors mounted on opposite sides of said magazine and extending vertically therein, opposed sets of tray supporting bars carried by said sets of conveyors, said bars being constructed and arranged to support trays loaded with preformed layers of filler tobacco substantially uniform in area, tray receiving guides located beneath said conveyors and constructed and arranged to receive trays delivered in succession from said bars, adjustable stop means in said magazine for positioning trays uniformly on said bars, means for intermittently driving said conveyors to deliver loaded trays seriatim to said guides, a layer holder, a tray removing device, and means for moving said device to push said trays in a substantially straight-line path of movement along said guides, said holder and device coacting to effect the removal of each of said layers from said flat trays in substantially intact original layer formation.

27. A cigar machine filler feed comprising a magazine, conveyors mounted on opposite sides of said magazine and extending vertically therein, opposed sets of tray supporting bars carried by said sets of conveyors and mounted equidistantly therealong, substantially flat uniplanar trays loaded with layers of filler tobacco substantially uniform in area adapted to be supported by said bars, tray receiving guides located beneath said conveyors and constructed and arranged to receive trays delivered in succession from said supports, means for intermittently driving said conveyors to deliver loaded trays seriatim to said guides, a pusher for moving a tray along said guides and from beneath said layer and out of said magazine, and a stripper positioned to engage a layer of tobacco on said tray and hold said layer against substantially lateral movement while said pusher is moving said tray from beneath said layer and out of said magazine, whereby said layer, being freed of support by said tray and held against lateral movement by said stripper, is removed from said tray free from substantial disarrangement of said tobacco forming said layer.

28. In a cigar machine, a magazine, a plurality of trays loaded with prearranged layers of tobacco of substantially quadrilateral form in plan in said magazine, a layer conveyor located in said magazine, coacting tray moving, and layer holding devices for successively delivering layers of tobacco to said conveyor and maintaining the prearranged condition of each layer delivered thereto substantially unchanged, means for operating said conveyor to advance a predetermined quantity of said layer to a cutting station, cutting mechanism at said station for cutting a strip of predetermined width from the advancing end of said layer, a cross feed including a conveyor constructed and arranged to receive each strip as cut from said layer, means for intermittently driving said conveyor to form a substantially continuous stream of tobacco on said conveyor, a bunch forming mechanism including cutting means for cutting bunch lengths from the advancing end of said stream, means for forming said bunch lengths into a column of superimposed lengths, and means for separating a bunch charge from said column.

29. In a cigar machine, the combination with a magazine, of a plurality of trays containing layers of tobacco of substantially quadrilateral form in plan, mechanism for feeding said trays in succession from said magazine, a conveyor located adjacent said magazine, driving means for said conveyor, a device for discharging a layer of tobacco from a tray delivered from said magazine onto said conveyor, said device including a tray displacing member, and a layer engaging member, and mechanism for effecting relative movement between said members, whereby said layer drops from said tray onto said conveyor in substantially undisturbed condition, means for operating said driving means intermittently to feed a layer of tobacco on said conveyor to a strip cutting station, a second conveyor located adjacent said cutting station, a strip cutter for cutting strips of predetermined width from said advancing layer, means for depositing each strip as cut onto said second conveyor to form a stream of tobacco, means for driving said second conveyor to advance said stream, and control mechanism for operating the driving means of said first-named and second conveyors to impart to said second conveyor, a plurality of advancing movements for each advancing movement of said first-named conveyor.

30. In a cigar machine, a stationary magazine adapted to contain a supply of substantially flat preformed vertically spaced layers of cigar filler tobacco, said layers being of substantially quadrilateral form in plan, mechanism for advancing a layer of said cigar filler tobacco of substantially quadrilateral form in plan edgewise, a cross feed constructed and arranged to receive tobacco advanced from said magazine by said mechanism, a bridge plate, means for positioning said bridge plate for movement into operative position above said cross feed to support the advancing end of said layer, means for cutting strips of predetermined width from the advancing end of said layer, means for withdrawing said bridge plate, and a stripper coacting therewith for depositing said strips cut from said layer in said cross feed, a cigar bunch forming mechanism and control mechanism for controlling the operation of said first-named mechanism and said cross feed.

31. In a cigar machine, a strip cutting station, a conveyor for advancing a relatively thin layer of flatly arranged spread out tobacco leaves and portions thereof of substantially quadrilateral form in plan to said station, a strip cutter at said station, means for intermittently advancing said conveyor step by step in amounts equal to predetermined substantially equal parts of the original width of said layer, a cross feed conveyor, means for operating said cutter to cut a strip of predetermined width from the advancing end of said layer, means for depositing each strip cut from said layer flatwise on said cross feed conveyor while maintaining the leaf arrangement thereof substantially undisturbed and forming a substantially continuous stream of shingled strips on said cross feed conveyor, said last-named means including coacting strip supporting and handling members, one of said members including a presser plate, and means for operating said members, a bunch length cutter, a cigar bunch forming mechanism, means for operating said bunch length cutter to cut bunch lengths from said stream, devices in said bunch forming mechanism for forming a column of bunch lengths wherein the original leaf arrangement and flat condition remains substantially unchanged, a control element coacting with said devices for initiating the operation of said cross feed conveyor when the quantity of tobacco in said column reaches a predetermined minimum, a bunch charge separating knife and, means for moving said knife between flat spread out leaf portions in said column to separate a bunch charge therefrom.

32. In a cigar machine, a storage magazine adapted to contain a plurality of layers of long filler cigar tobacco, a layer conveyor associated with said magazine constructed and arranged to support a layer of tobacco delivered thereto from said storage magazine, means for intermittently driving said layer conveyor, each movement of said layer conveyor being equal to a substantially equal part of the original width of said layer, a cutter, and means for operating said cutter to sever a strip of predetermined width from the advancing end of said layer on said conveyor, a second conveyor located closely adjacent and below said cutter, means for depositing each strip on said second conveyor and forming a substantially continuous stream thereon, means for driving said second conveyor to advance said stream, a bunch length cutter, means for operating said bunch length cutter to cut bunch lengths of filler tobacco from the advancing end of said stream, a column forming magazine, means for stacking said bunch lengths and forming a column of tobacco in said magazine, means for compacting said tobacco in said column, a charge separating member, and means for moving said member into said magazine for separating a measured bunch charge from said column of tobacco.

33. In a cigar machine, a storage magazine adapted to contain a plurality of wide layers of long filler cigar tobacco, a layer conveyor associated with said magazine constructed and arranged to support a layer of tobacco delivered thereto from said storage magazine, means for intermittently driving said layer conveyor, each movement of said layer conveyor being equal to a substantially equal part of the original width of said layer, a cutter, means for operating said cutter to sever a strip of predetermined width from the advancing end of said layer on said conveyor, a second conveyor, means for depositing each strip on said second conveyor and forming a substantially continuous stream thereon, means for driving said second conveyor to advance said stream, a bunch length cutter, means for operating said bunch length cutter to cut bunch lengths of filler tobacco from the advancing end of said stream, a column forming magazine, means for stacking said bunch lengths and forming a column of tobacco in said magazine, means for compacting said tobacco in said column, a charge separating member, means for moving said member into said magazine for separating a measured bunch charge from said column of tobacco, a detector device mounted on said compacting means, and control mechanism set in operation by said device for driving said layer conveyor and said second conveyor when the tobacco in said column reaches a predetermined minimum.

34. In a cigar machine, a layer conveyor constructed and arranged to support a preformed wide layer of tobacco having a top surface and a bottom surface, said layer being substantially quadrilateral in form with the major axes of the pieces of tobacco in said layer extending substantially in one direction, an intermittent drive for said conveyor to advance said layer edgewise in a path of movement at right angles to the position occupied by said axes of said pieces of tobacco, a second conveyor located substantially at right angles to and below said first conveyor, an intermittent drive for said second conveyor, a layer strip cutter, a bunch length cutter, means for operating said cutters to cut strips substantially uniform in width from said layer, and bunch lengths, respectively, mechanism coacting with said layer strip cutter for depositing cut strips on said second conveyor with the top surface of said strips upward, said mechanism including a plate for moving each strip only in a downward direction onto said second conveyor, and strip handling members coacting therewith for preventing substantial disarrangement of the tobacco forming each strip as it is deposited on said second conveyor, mechanism for associating a predetermined quantity of bunch lengths in columnar formation, means for compacting said tobacco in said column, and control means operative when the tobacco in said column reaches a predetermined minimum for operating the drives of said first and second conveyors.

RUPERT E. RUNDELL.

(References on following page)

REFERENCES CITED

The following references are of record in the file of this patent:

UNITED STATES PATENTS

| Number | Name | Date |
|---|---|---|
| 523,940 | McDougall | July 31, 1894 |
| 698,617 | Allen | Apr. 29, 1902 |
| 1,561,856 | Heyman | Nov. 17, 1925 |
| 1,633,236 | Troiel | June 21, 1927 |
| 1,740,571 | Bronander | Dec. 24, 1929 |
| 1,837,605 | Baker | Dec. 22, 1931 |
| 1,871,354 | Anderson | Aug. 9, 1932 |
| 1,926,227 | Carlson | Sept. 12, 1933 |
| 2,255,054 | Halstead | Sept. 9, 1941 |
| 2,276,289 | Clausen | Mar. 17, 1942 |
| 2,276,361 | Wheeler | Mar. 17, 1942 |
| 2,284,472 | Halstead | May 26, 1942 |
| 2,378,953 | Rundell | June 26, 1945 |